US012638856B2

(12) United States Patent (10) Patent No.: US 12,638,856 B2
Yoshikawa et al. (45) Date of Patent: May 26, 2026

(54) AUTONOMOUS MOVEMENT SYSTEM

(71) Applicant: MAKITA CORPORATION, Anjo (JP)

(72) Inventors: Tatsuya Yoshikawa, Anjo (JP);
Hirokatsu Yamamoto, Anjo (JP);
Masahiro Kojima, Anjo (JP); **Genki
Toyoda**, Anjo (JP)

(73) Assignee: MAKITA CORPORATION, Anjo (JP)

( * ) Notice: Subject to any disclaimer, the term of this
patent is extended or adjusted under 35
U.S.C. 154(b) by 21 days.

(21) Appl. No.: 18/800,597

(22) Filed: Aug. 12, 2024

(65) Prior Publication Data

US 2025/0076885 A1 Mar. 6, 2025

(30) Foreign Application Priority Data

Sep. 1, 2023 (JP) ................................. 2023-142362

(51) Int. Cl.
*G05D 1/244* (2024.01)
*B60L 53/36* (2019.01)
*G05D 1/661* (2024.01)
*A01D 34/00* (2006.01)
*G05D 105/15* (2024.01)

(52) U.S. Cl.
CPC .............. *G05D 1/244* (2024.01); *B60L 53/36*
(2019.02); *G05D 1/661* (2024.01); *A01D
34/008* (2013.01); *B60L 2200/40* (2013.01);
*G05D 2105/15* (2024.01)

(58) Field of Classification Search
CPC .... G05D 1/244; G05D 1/661; G05D 2105/15;
B60L 53/36; B60L 2200/40; A01D
34/008

USPC .......................................................... 701/23
See application file for complete search history.

(56) References Cited

U.S. PATENT DOCUMENTS

| | | | | |
|---|---|---|---|---|
| 2017/0282735 A1* | 10/2017 | Yamamura | ........... | G05D 1/0225 |
| 2023/0071262 A1* | 3/2023 | Lundkvist | ............ | G05D 1/0259 |
| 2023/0320267 A1* | 10/2023 | Lundkvist | ............ | G05D 1/0225 |
| 2024/0053765 A1* | 2/2024 | Dobashi | ................. | G05D 1/248 |

FOREIGN PATENT DOCUMENTS

JP 2017-182635 A 10/2017

* cited by examiner

*Primary Examiner* — Mahmoud S Ismail
(74) *Attorney, Agent, or Firm* — Oliff PLC

(57) ABSTRACT

An autonomous movement system may include: a working
robot configured to perform an operation while moving
autonomously in a working area; a charging station config-
ured to charge the working robot; a boundary wire defining
the working area; and a station wire disposed at the charging
station and electrically connected to the boundary wire. The
working robot may include: a magnetic detecting unit con-
figured to detect a magnetic field generated by the boundary
wire and a magnetic field generated by the station wire; and
a control unit configured to detect the station wire based on
a detection result by the magnetic detecting unit. The
charging station may include: a charging terminal config-
ured to be electrically connected to the working robot; and
a signal generator configured to supply an identical electric
signal to the boundary wire and the station wire.

15 Claims, 16 Drawing Sheets

FRONT ⟷ REAR

DOWN

AUTONOMOUS MOVEMENT SYSTEM

REFERENCE TO RELATED APPLICATIONS

This application claims priority to Japanese Patent Application No. 2023-142362, filed on Sep. 1, 2023, the entire contents of which are hereby incorporated by reference into the present application.

TECHNICAL FIELD

The disclosure herein relates to an autonomous movement system.

BACKGROUND ART

An autonomous movement system is described in Japanese Patent Application Publication No. 2017-182635. This autonomous movement system includes a working robot configured to perform an operation while moving autonomously in a working area, a charging station configured to charge the working robot, a boundary wire defining the working area and generating a magnetic field when a current flows in the boundary wire, and a station wire disposed at the charging station and generating a magnetic field when a current flows in the station wire. The working robot includes a working unit configured to perform the operation, a working motor configured to drive the working unit, a movement unit configured to move the working robot, a movement motor configured to drive the movement unit, a battery configured to be charged at the charging station and supply power to the working motor and the movement motor, a magnetic detecting unit configured to detect the magnetic field generated by the boundary wire and the magnetic field generated by the station wire, and a control unit configured to control the working motor and the movement motor and detect the station wire based on a detection result by the magnetic detecting unit. The charging station includes a charging terminal configured to be electrically connected to the working robot, a first signal generator configured to supply a first electric signal to the boundary wire, and a second signal generator configured to supply a second electric signal to the station wire.

SUMMARY

The above autonomous movement system requires the second signal generator configured to supply the second electric signal to the station wire in order to detect the station wire. This complicates the configuration of the charging station. The disclosure herein provides a technology that allows for detection of a station wire using a simple charging station configuration.

An autonomous movement system disclosed herein may comprise: a working robot configured to perform an operation while moving autonomously in a working area; a charging station configured to charge the working robot; a boundary wire defining the working area, wherein the boundary wire generates a magnetic field when a current flows in the boundary wire; and a station wire disposed at the charging station and electrically connected to the boundary wire, wherein the station wire generates a magnetic field when a current flows in the station wire. The working robot may comprise: a working unit configured to perform the operation; a working motor configured to drive the working unit; a movement unit configured to move the working robot; a movement motor configured to drive the movement unit; a battery configured to be charged at the charging station and supply power to the working motor and the movement motor; a magnetic detecting unit configured to detect the magnetic field generated by the boundary wire and the magnetic field generated by the station wire; and a control unit configured to control the working motor and the movement motor and detect the station wire based on a detection result by the magnetic detecting unit. The charging station may comprise: a charging terminal configured to be electrically connected to the working robot; and a signal generator configured to supply an identical electric signal to the boundary wire and the station wire.

According to the configuration above, the single signal generator supplies the identical electric signal to the boundary wire and the station wire. This allows for detection of the station wire using the simple charging station configuration.

BRIEF DESCRIPTION OF DRAWINGS

FIG. 2 shows a side view of a working robot 12 and a charging station 14 according to the embodiment.

DESCRIPTION

Figure 1:
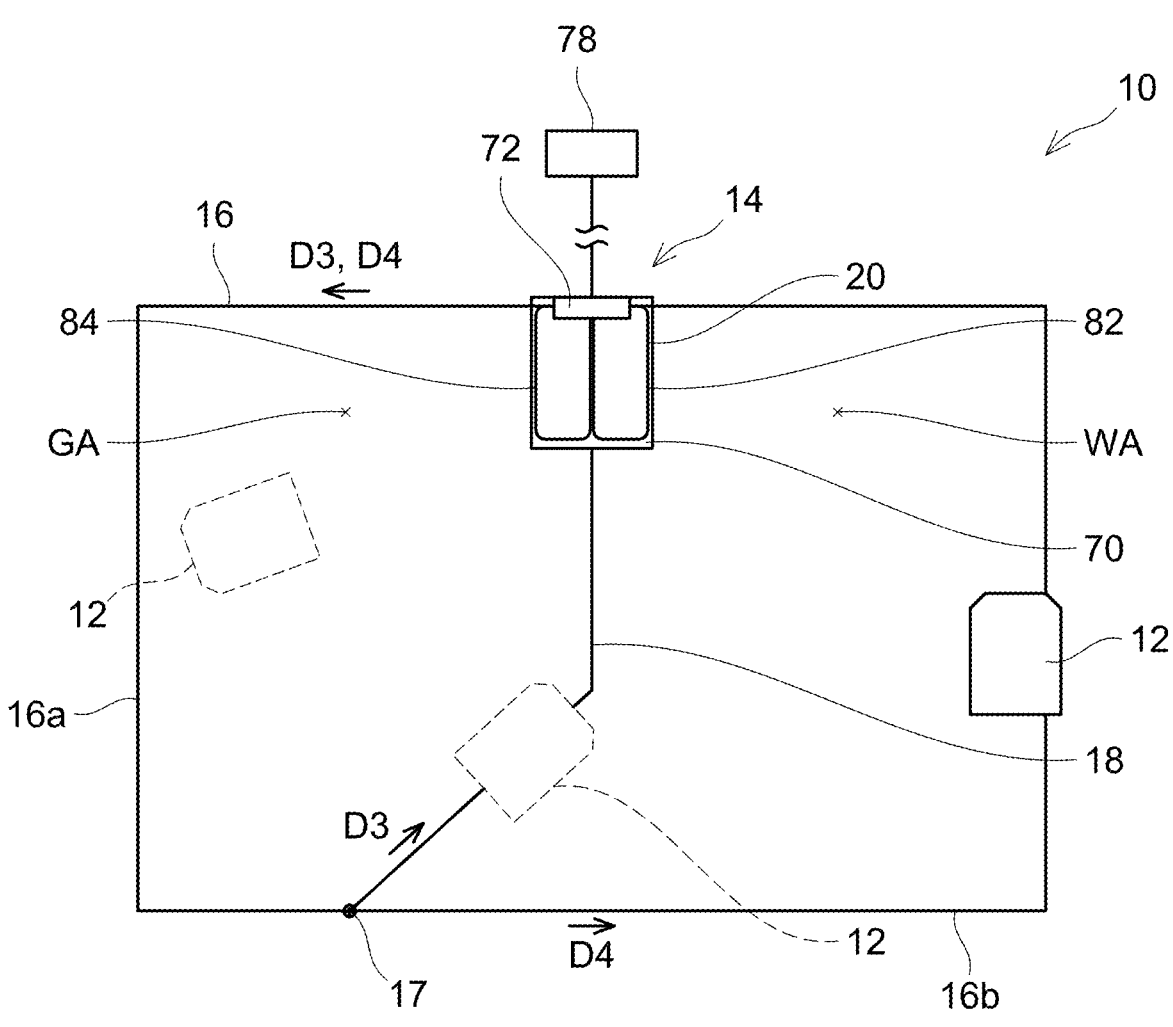
FIG. 1 schematically shows an autonomous movement system 10 according to an embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved autonomous movement systems, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the station wire may comprise a magnetic field enhancing structure configured to generate, when a current flows in the station wire, the magnetic field having higher intensity than intensity of the magnetic field generated by the boundary wire when a current flows in the boundary wire.

In the configuration above, the intensity of magnetic field generated by the station wire is higher than the intensity of magnetic field generated by the boundary wire. This facilitates detection of the station wire.

In one or more embodiments, the control unit may be configured to detect the station wire based on at least intensity of the magnetic field generated by the station wire when a current flows in the station wire.

The configuration above allows for detection of the station wire with the simple configuration using the magnetic field intensity.

In one or more embodiments, the station wire may be electrically connected in series to the boundary wire.

The configuration above allows the identical electric signal to be supplied to the boundary wire and the station wire using the simple configuration.

In one or more embodiments, the control unit may be configured to: store intensity of the magnetic field of the station wire when the working robot is at the charging station; and detect the station wire based on the stored intensity of the magnetic field and the intensity of the magnetic field of the station wire detected by the magnetic detecting unit.

The configuration above allows for more accurate detection of the station wire as compared to configurations in which the control unit does not store the intensity of magnetic field of the station wire when the working robot is at the charging station, such as a configuration in which the intensity of magnetic field is stored in advance during manufacturing of the working robot, a configuration in which the intensity of magnetic field is set by a user, etc.

In one or more embodiments, the control unit may be configured to: execute a separation process to separate the working robot electrically connected to the charging terminal from the charging station; and obtain the intensity of the magnetic field of the station wire after the working robot has been separated from the charging terminal during the separation process.

In a configuration in which the control unit obtains the intensity of magnetic field of the station wire before the working robot is separated from the charging terminal, the control unit has to obtain the intensity of magnetic field of the station wire while determining whether the working robot has separated from the charging terminal or not. The configuration above allows the control unit to determine separation of the working robot from the charging terminal and obtain the intensity of magnetic field of the station wire separately.

In one or more embodiments, the separation process may comprise a turn process to turn the working robot after it has been separated from the charging terminal. The control unit may be configured to obtain the intensity of the magnetic field of the station wire during the turn process.

In the configuration above in which the working robot turns, the distance between the working robot and the charging station is less likely to change as compared to a configuration in which the working robot rectilinearly moves away from the charging station. Since the control unit obtains the intensity of magnetic field of the station wire during the turn process, variation in the intensity of magnetic field is small as compared to a configuration in which the control unit obtains the intensity of magnetic field of the station wire while the working robot is rectilinearly moving away from the charging station.

In one or more embodiments, the magnetic detecting unit may comprise a plurality of magnetic sensors configured to detect the magnetic field generated by the boundary wire and the magnetic field generated by the station wire. The control unit may be configured to obtain intensities of the magnetic field of the station wire detected by the plurality of magnetic sensors during the turn process.

The configuration above allows for detection of the station wire even when one of the plurality of magnetic sensors malfunctions.

In one or more embodiments, the control unit may be configured to store a peak intensity of the magnetic field of the station wire.

The configuration above allows for accurate detection of the station wire using the peak intensity of magnetic field of the station wire.

In one or more embodiments, the control unit may be configured to: set a threshold value equal to or more than 80% of the stored peak intensity; and detect the station wire based on the set threshold value and the intensity of the magnetic field of the station wire detected by the magnetic detecting unit.

The intensity of magnetic field detected by the magnetic detecting unit becomes smaller as the distance between the working robot and the station wire becomes larger. Since the threshold value is set as a predetermined proportion of the peak intensity of the magnetic field, the configuration above allows for detection of the station wire even when the working robot is far away from the station wire.

In one or more embodiments, the station wire may comprise: a first loop portion configured to increase an absolute value of a positive value of intensity of the magnetic field of the station wire; and a second loop portion configured to increase an absolute value of a negative value of the intensity of the magnetic field of the station wire. The control unit may be configured to control the movement motor based on the intensity of magnetic field generated by the first loop portion to move the working robot along the first loop portion.

Generally, the station wire is detected more accurately in a configuration in which the control unit detects the station wire based on the positive value of magnetic field intensity than in a configuration in which the control unit detects the station wire based on the negative value of magnetic field intensity. In the configuration above, the intensity of magnetic field generated by the first loop portion is used, and thus the working robot can be accurately moved along the first loop portion.

In one or more embodiments, the control unit may be configured to execute a docking process to electrically connect the working robot to the charging terminal when the control unit detects the station wire while the working robot is returning to the charging station.

If the docking process is executed according to methods different from the method detecting the station wire, for example in response to a GPS detecting the position of the working robot, the working robot may collide with the charging station before the docking process is executed because the detected position of the working robot could be different from the actual position of the working robot. In the configuration above, the docking process is executed in response to detection of the station wire, and thus the collision of the working robot with the charging station can be prevented.

In one or more embodiments, the control unit may be configured to execute a movement direction changing process to change a movement direction of the working robot when the control unit detects the station wire while the working robot is performing the operation.

The configuration above prevents the working robot from colliding with the charging station.

(Embodiment) As show in FIG. 1, an autonomous movement system 10 comprises a working robot 12, a charging station 14, a boundary wire 16, a guide wire 18, and a station wire 20. The working robot 12 is for example a mower. The working robot 12 is placed on the ground when used. The working robot 12 mows a lawn on the ground while autonomously moving within a working area WA surrounded by the boundary wire 16. Hereinafter, a longitudinal direction of the working robot 12 is termed a front-rear direction, a width direction of the working robot 12 is termed a right-left direction, and a direction perpendicular to the front-rear direction and the right-left direction is termed an up-down direction.

Figure 2:
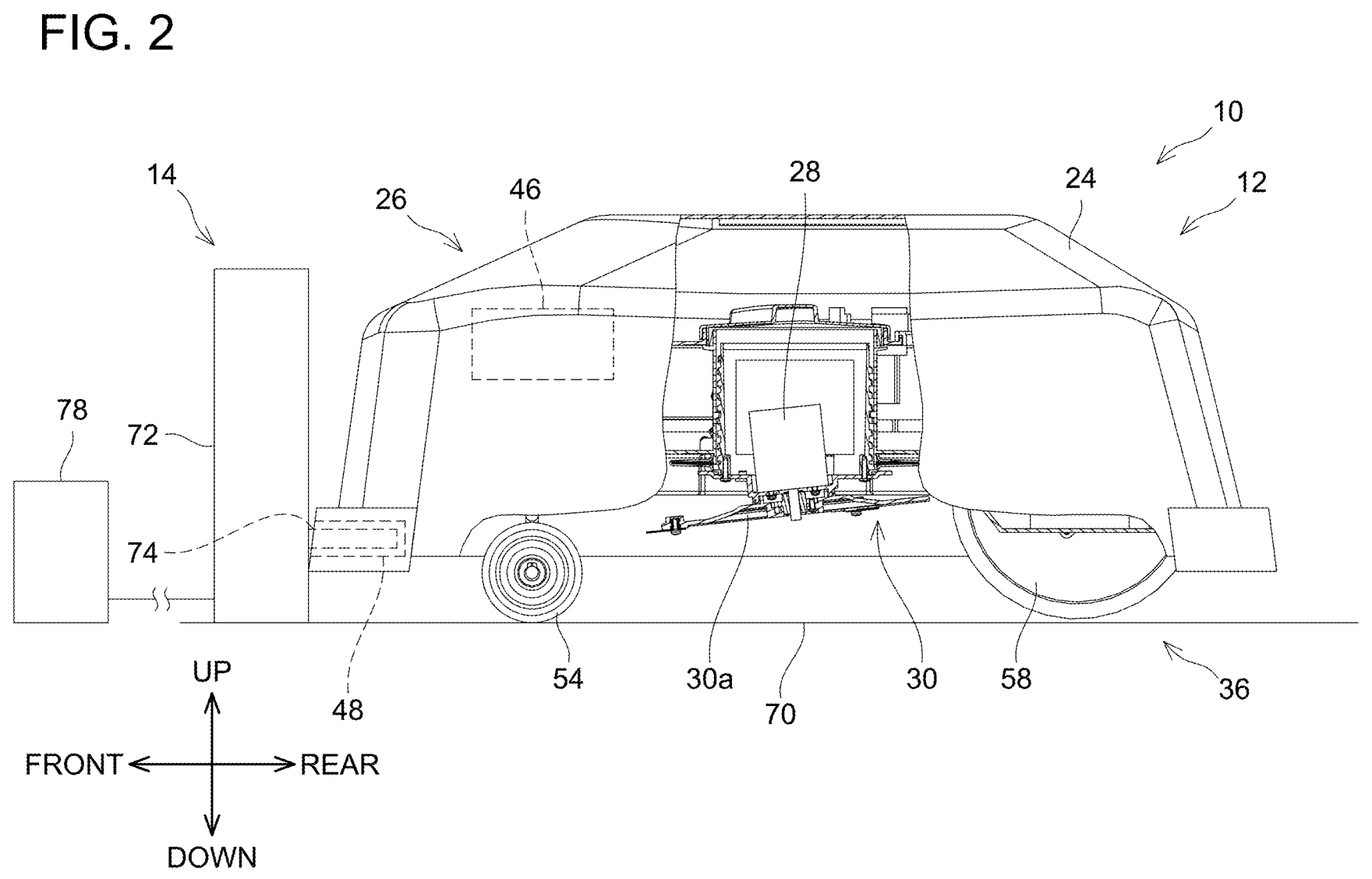
Figure 4:
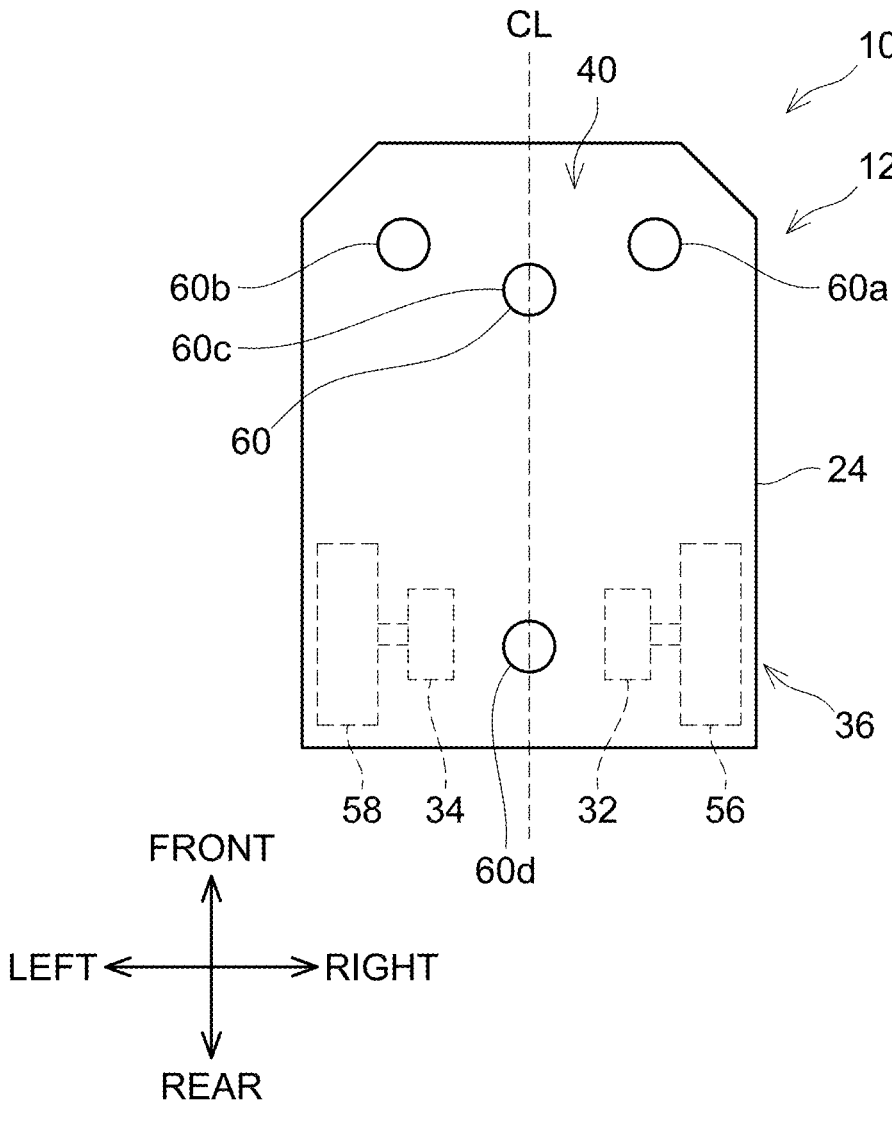
FIG. 4 shows a top view of the working robot 12 according to the embodiment.
Figure 5:
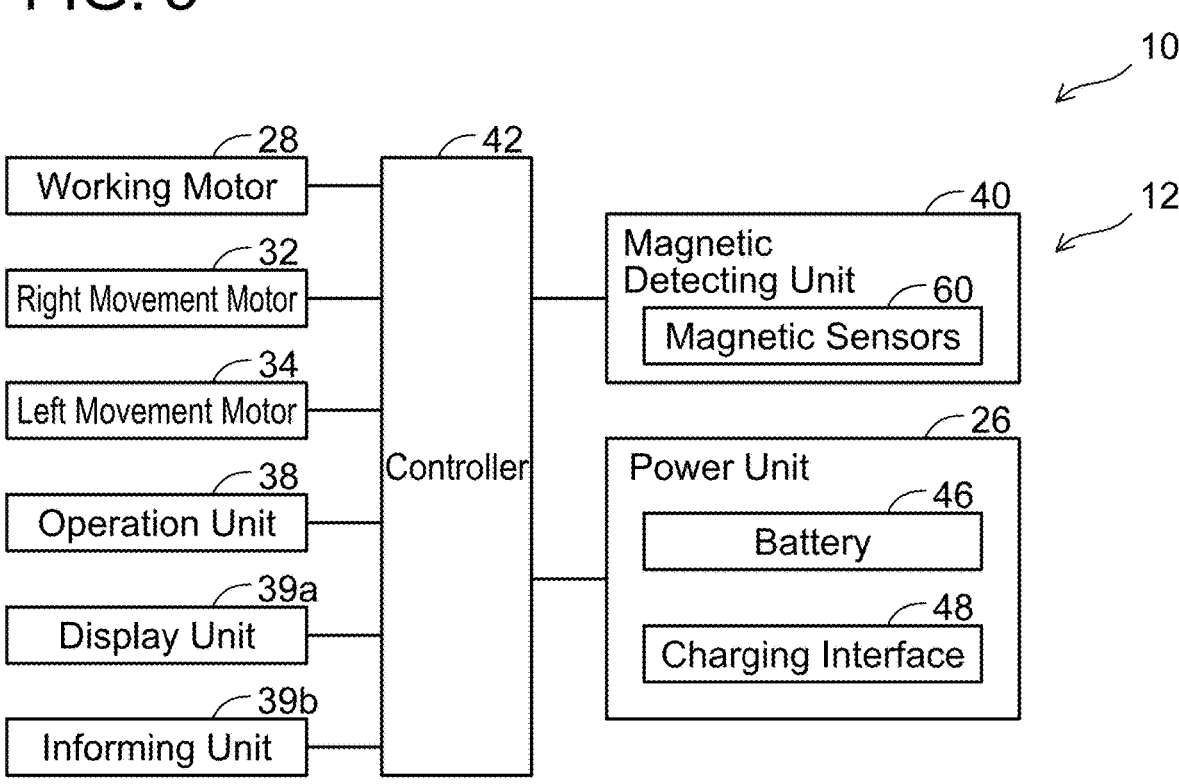
FIG. 5 shows an electrical block diagram of the working robot 12 according to the embodiment.

As shown in FIG. 2, the working robot 12 comprises a housing 24, a power unit 26, a working motor 28, a working unit 30, a right movement motor 32 (see FIG. 3), a left movement motor 34 (see FIG. 3), a movement unit 36, a manipulation unit 38 (see FIG. 3), a display unit 39*a* (see FIG. 3), an informing unit 39*b* (see FIG. 3), a magnetic detecting unit 40 (see FIG. 4), and a control unit 42 (see FIG. 5).

The power unit 26 is housed in the housing 24. The power unit 26 comprises a battery 46 and a charging interface 48. The battery 46 is a secondary battery comprising a lithium-ion battery. The battery 46 is unremovable from the housing 24. The charging interface 48 is located at the front end of the housing 24. The charging interface 48 is electrically connected to the battery 46. The working robot 12 is configured to dock with the charging station 14 (see FIG. 1) via the charging interface 48. When the working robot 12 is docked with the charging station 14, the battery 46 can be charged with power supplied through the charging station 14 and the charging interface 48 from an external power supply 78.

The working motor 28 is supported by the housing 24. The working motor 28 is for example a brushless motor. The working motor 28 operates with the power in the battery 46.

The working unit 30 comprises a substantially disk-shaped blade 30*a*. The blade 30*a* is fixed to the output shaft of the working motor 28. The output shaft tilts relative to the up-down direction. The blade 30*a* is rotated by the working motor 28, thereby mowing the lawn on the ground.

Figure 3:
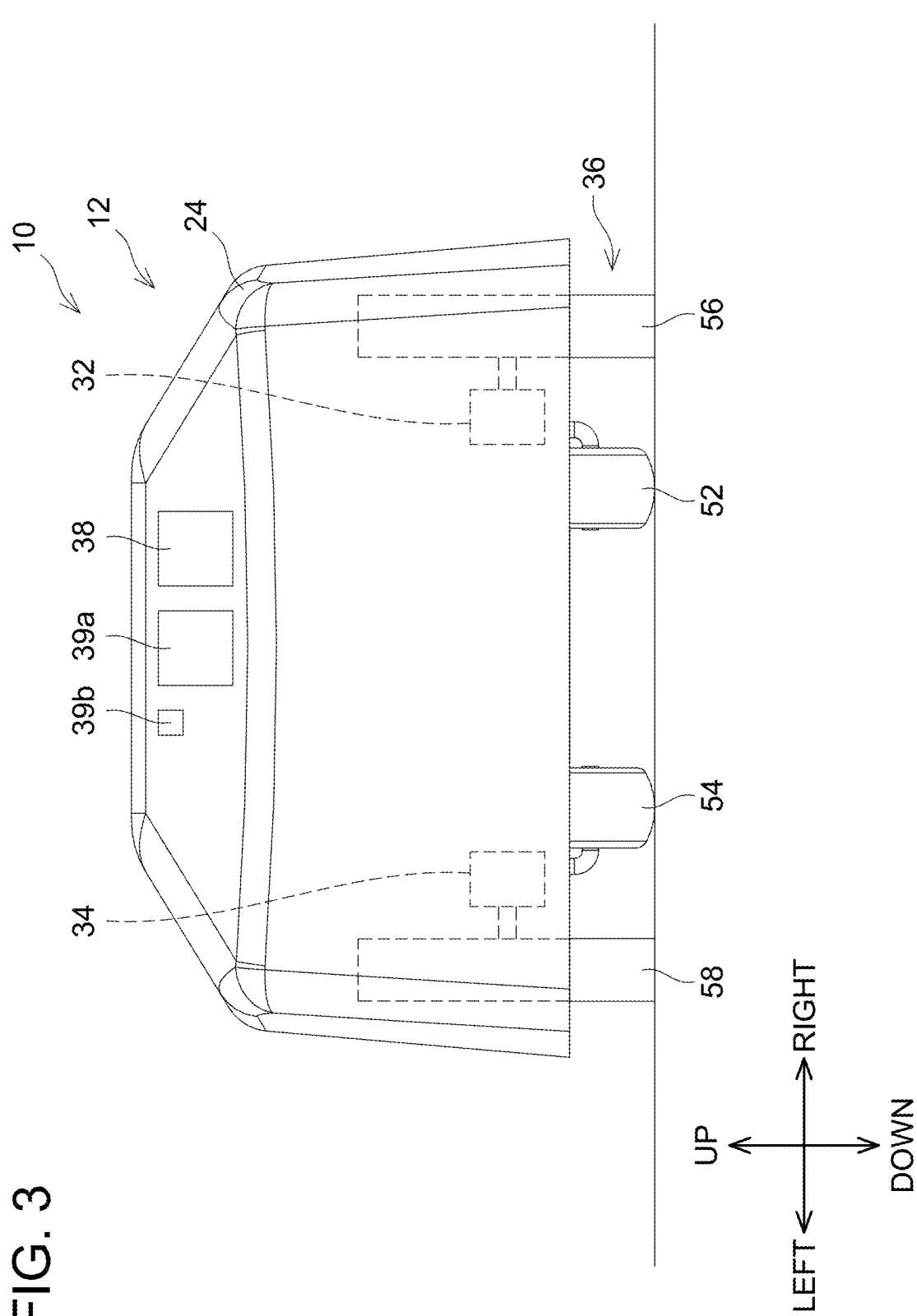
FIG. 3 shows a rear view of the working robot 12 according to the embodiment.

As shown in FIG. 3, the right movement motor 32 and the left movement motor 34 are supported by the housing 24. The right movement motor 32 and the left movement motor 34 are for example brushless motors. The right movement motor 32 and the left movement motor 34 operate with the power in the battery 46 (see FIG. 2).

The movement unit 36 comprises a right front auxiliary wheel 52, a left front auxiliary wheel 54, a right rear drive wheel 56, and a left rear drive wheel 58. The right front auxiliary wheel 52 and the left front auxiliary wheel 54 are rotatably attached to the housing 24. The right rear drive wheel 56 is fixed to the output shaft of the right movement motor 32. The left rear drive wheel 58 is fixed to the output shaft of the left movement motor 34. The output shafts of the right movement motor 32 and the left movement motor 34 extend in the right-left direction. The right rear drive wheel 56 is rotated by the right movement motor 32, and the left rear drive wheel 58 is rotated by the left movement motor 34, thereby moving the working robot 12 forward and rearward as well as turning the working robot 12.

The manipulation unit 38 is located on an outer surface of the housing 24. The manipulation unit 38 comprises manipulative switches. A user manipulates the manipulation unit 38 for example to switch the working robot 12 between an on-state and an off-state, to set a working condition of the working robot 12, etc.

The display unit 39*a* is for example a display. The display unit 39*a* displays various information. The manipulation unit 38 and the display unit 39*a* may be integrated as a touch screen.

The informing unit 39*b* is for example a buzzer configured to emit a sound. In a variant, the informing unit 39*b* may be a light device configured to emit light. The informing unit 39*b* emits a sound for example when an abnormality occurs in the working robot 12.

As shown in FIG. 4, the magnetic detecting unit 40 is supported by the housing 24. The magnetic detecting unit 40 comprises a plurality of magnetic sensors 60 (four magnetic sensors 60 in this embodiment). The magnetic sensors 60 are for example search coils, Hall sensors, or the like. The magnetic sensors 60 each detect a magnetic field intensity in the up-down direction.

The plurality of magnetic sensors 60 comprises a right front magnetic sensor 60*a*, a left front magnetic sensor 60*b*, a center front magnetic sensor 60*c*, and a rear magnetic sensor 60*d*. The right front magnetic sensor 60*a*, the left front magnetic sensor 60*b*, and the center front magnetic sensor 60*c* are located forward of the center of the housing 24 in the front-rear direction. The right front magnetic sensor 60*a* is located in a right front portion of the housing 24. The left front magnetic sensor 60*b* is located in a left front portion of the housing 24. In the right-left direction, a distance from the right front magnetic sensor 60*a* to a center line CL is substantially equal to a distance from the left front magnetic sensor 60*b* to the center line CL. The center line CL extends in the front-rear direction and located in the center of the housing 24 in the right-left direction. The center front magnetic sensor 60c and the rear magnetic sensor 60d are located near the center line CL. The center front magnetic sensor 60c is located in a front portion of the housing 24. The rear magnetic sensor 60d is located rearward of the center of the housing 24 in the front-rear direction. The rear magnetic sensor 60d is located in a rear portion of the housing 24.

As shown in FIG. 5, the control unit 42 is electrically connected to the power unit 26, the working motor 28, the right movement motor 32, the left movement motor 34, the manipulation unit 38, the display unit 39a, the informing unit 39b, and the magnetic detecting unit 40. The control unit 42 comprises a microcomputer (not shown) and a memory (not shown). The control unit 42 controls the rotation direction and rotation speed of the right movement motor 32 independently from the rotation direction and rotation speed of the left movement motor 34. For example, when the control unit 42 controls the right movement motor 32 and the left movement motor 34 such that they rotate in the forward direction at the same rotation speed, the working robot 12 moves forward. When the control unit 42 controls the right movement motor 32 and the left movement motor 34 such that they rotate in the reverse direction at the same rotation speed, the working robot 12 moves rearward. When the control unit 42 controls the right movement motor 32 and the left movement motor 34 such that the right movement motor 32 rotates in the forward direction and the left movement motor 34 rotates in the reverse direction, the working robot 12 turns on the spot. When the control unit 42 controls the right movement motor 32 and the left movement motor 34 such that they rotate in the forward direction (or in the reverse direction) at different rotation speeds, the working robot 12 turns while moving forward (or rearward). The control unit 42 autonomously controls the working robot 12 according to various programs stored in the memory. For example, by the control unit 42 acquiring signals from the manipulation unit 38 and the magnetic detecting unit 40 and controlling the working motor 28, the right movement motor 32, and the left movement motor 34 accordingly, the working robot 12 can mow the lawn while autonomously moving.

Figure 6:
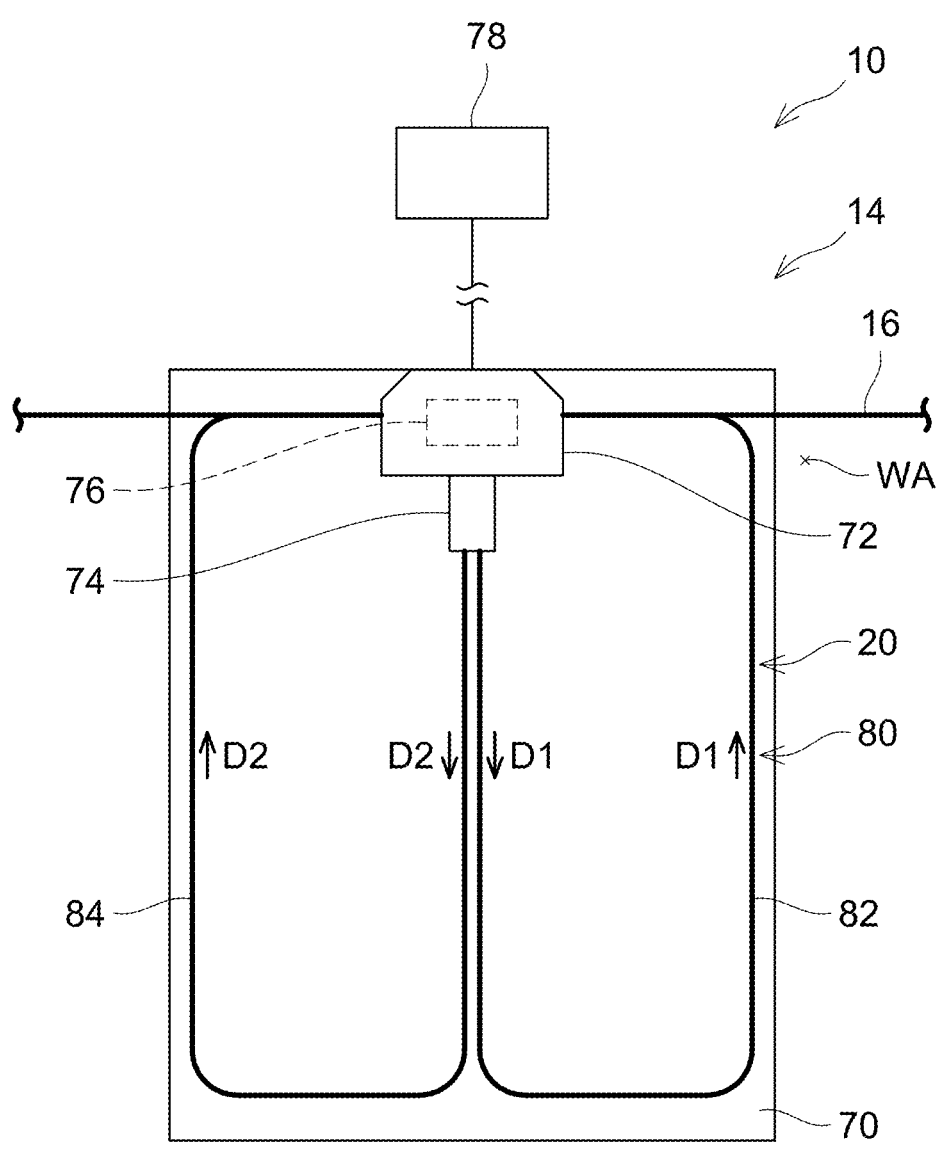
FIG. 6 schematically shows a part of the autonomous movement system 10 near the charging station 14, according to the embodiment.

As shown in FIG. 6, a part of the charging station 14 is located within the working area WA and another part thereof is located outside the working area WA. The charging station 14 comprises a pad 70, a stand 72, a charging terminal 74, and a signal generator 76. The pad 70 is placed on the ground. The stand 72 is located on the pad 70. The stand 72 has a substantially cuboid shape. The stand 72 is electrically connected to the external power supply 78. The charging terminal 74 projects from the stand 72 in a direction away from the boundary wire 16. The charging terminal 74 is substantially perpendicular to the stand 72. The charging terminal 74 is located within the working area WA. As shown in FIG. 2, the charging terminal 74 is configured to dock with the charging interface 48 of the working robot 12. When the charging terminal 74 docks with the charging interface 48, the charging station 14 electrically connects to the working robot 12. Herein, "the working robot 12 is at the charging station 14" means that at least a part of the working robot 12 overlaps the charging station 14 (the pad 70, the stand 72, the charging terminal 74, the signal generator 76) in the up-down direction.

Figure 7:
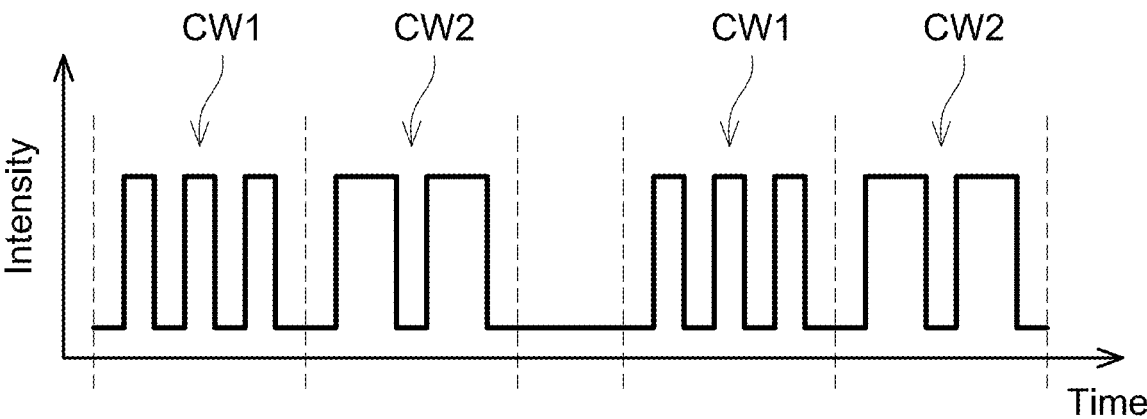
FIG. 7 shows a diagram illustrating current waveforms CW1 of a first electric signal and current waveforms CW2 of a second electric signal.

As shown in FIG. 6, the signal generator 76 is housed in the stand 72. The signal generator 76 is configured to supply a first electric signal to the boundary wire 16 and the station wire 20. Further, the signal generator 76 is also configured to supply a second electric signal to the boundary wire 16 and the guide wire 18. The second electric signal is different from the first electric signal. As shown in FIG. 7, a current waveform CW1 of the first electric signal is different from a current waveform CW2 of the second electric signal. For example, the phase of the current waveform CW1 of the first electric signal is different from the phase of the current waveform CW2 of the second electric signal. The first electric signal and the second electric signal are supplied for example alternately by the signal generator 76. The first electric signal and the second electric signal are supplied for example at predetermined intervals by the signal generator 76.

Figure 8:
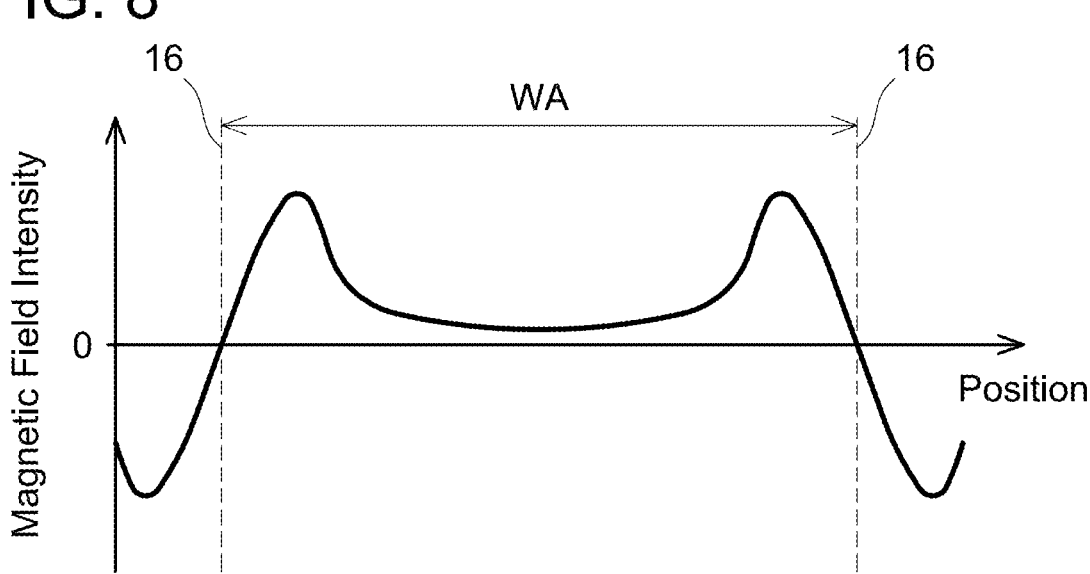
FIG. 8 shows a waveform for magnetic field intensities within and out of a working area WA and a waveform for magnetic field intensities within and out of a guide area GA.

As shown in FIG. 1, the boundary wire 16 defines the working area WA. For example, the boundary wire 16 is buried in the ground near the ground surface. The boundary wire 16 is electrically connected to the signal generator 76 (see FIG. 6) of the charging station 14 via the station wire 20. When a current flows in the boundary wire 16, a magnetic field that surrounds the boundary wire 16 is generated according to the Ampere's law. The direction of the magnetic field within the working area WA is different from the direction of the magnetic field outside the working area WA. As shown in FIG. 8, the intensity of the magnetic field in the up-down direction is zero on/immediately above the boundary wire 16, indicates a positive value within the working area WA, and indicates a negative value outside the working area WA. The intensity of the magnetic field depends on the distance from the boundary wire 16. The control unit 42 obtains the intensity of the magnetic field from the magnetic detecting unit 40 and determines whether the working robot 12 is within the working area WA.

As shown in FIG. 1, for example, the guide wire 18 is buried in the ground near the ground surface. The material and diameter of the guide wire 18 are the same as those of the boundary wire 16. The guide wire 18 is electrically connected to a first point 17 of the boundary wire 16. The first point 17 can be positioned anywhere between one end and the other end of the boundary wire 16. Hereinafter, a portion of the boundary wire 16 between the one end and the first point 17 may be termed a first boundary wire portion 16a, and another portion of the boundary wire 16 between the first point 17 and the other end may be termed a second boundary wire portion 16b. The guide wire 18 is also electrically connected to the signal generator 76 (see FIG. 6) of the charging station 14. The guide wire 18 and the first boundary wire portion 16a define a guide area GA. When a current flows in the guide wire 18 and the first boundary wire portion 16a, a magnetic field that surrounds the guide wire 18 and the first boundary wire portion 16a is generated according to the Ampere's law. In this embodiment, an electric signal supplied to the boundary wire 16 (the first boundary wire portion 16a and the second boundary wire portion 16b) is different from an electric signal supplied to the guide wire 18 and the first boundary wire portion 16a. The control unit 42 obtains the intensity of the magnetic field from the magnetic detecting unit 40 and determines whether the working robot 12 is within the guide area GA.

As shown in FIG. 6, the station wire 20 is located at the pad 70 of the charging station 14. The station wire 20 is electrically connected in series to the boundary wire 16. The station wire 20 is also electrically connected to the signal generator 76 (see FIG. 6). The material and diameter of the station wire 20 are the same as those of the boundary wire 16. The station wire 20 comprises a magnetic field enhancing structure 80. The magnetic field enhancing structure 80 generates a magnetic field that has a higher intensity than both the absolute value of the peak intensity of the magnetic field generated by the boundary wire 16 and the absolute value of the peak intensity of the magnetic field generated by the guide wire 18.

Figure 9:
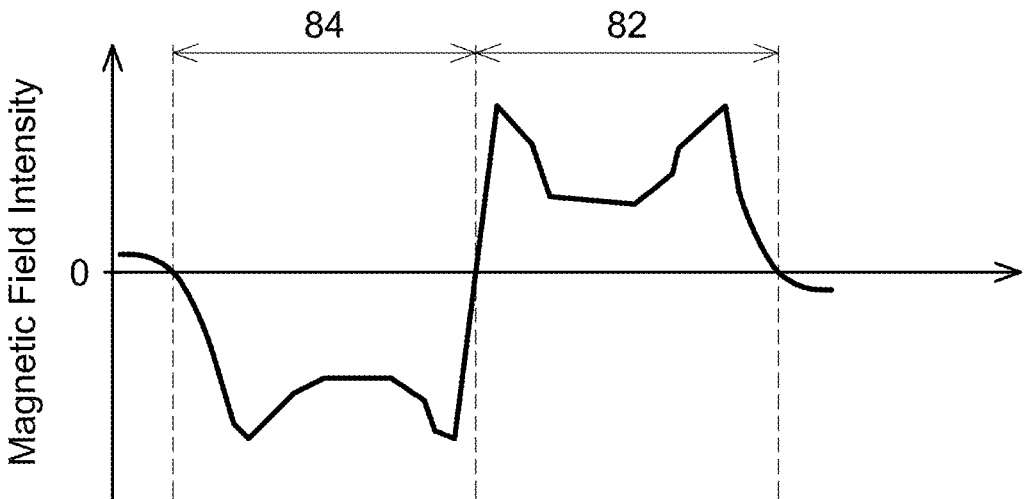
FIG. 9 shows a waveform for magnetic field intensities within and out of an area surrounded by a station wire 20, according to the embodiment.

The magnetic field enhancing structure 80 comprises a first loop portion 82 and a second loop portion 84 each having a looped shape. The first loop portion 82 and the second loop portion 84 are adjacent to each other. The charging terminal 74 of the charging station 14 is located on the boundary between the first loop portion 82 and the second loop portion 84. The first loop portion 82 and the second loop portion 84 are formed by winding the single station wire 20 more than once (e.g., twice). A first number of windings of the station wire 20 in the first loop portion 82 is the same as a second number of windings of the station wire 20 in the second loop portion 84. In the station wire 20, a current flows in the first loop portion 82 in a counterclockwise direction D1 and flows in the second loop portion 84 in a clockwise direction D2. As shown in FIG. 9, the intensity of the magnetic field in the up-down direction near the pad 70 is zero in the vicinity of the boundary between the first loop portion 82 and the second loop portion 84, indicates a positive value within the first loop portion 82, and indicates a negative value within the second loop portion 84. The absolute value of the peak intensity of a magnetic field generated by the first loop portion 82 is substantially the same as the absolute value of the peak intensity of a magnetic field generated by the second loop portion 84. The absolute value of the peak intensity of the magnetic field generated by the first loop portion 82 is larger than both the absolute value of the peak intensity of the magnetic field of the boundary wire 16 within the working area WA and the absolute value of the peak intensity of the magnetic field of the guide wire 18 within the guide area GA. For example, the absolute value of the peak intensity of the magnetic field generated by the first loop portion 82 increases in proportion to the first number of windings of the station wire 20. The absolute value of the peak intensity of the magnetic field generated by the second loop portion 84 is larger than both the absolute value of the peak intensity of the magnetic field generated by the boundary wire 16 outside the working area WA and the absolute value of the peak intensity of the magnetic field generated by the guide wire 18 outside the guide area GA. For example, the absolute value of the peak intensity of the magnetic field generated by the second loop portion 84 increases in proportion to the second number of windings of the station wire 20. The control unit 42 obtains one or more intensities of the magnetic fields from the magnetic detecting unit 40 to determine whether the working robot 12 is within the first loop portion 82 and/or within the second loop portion 84 and detect that the working robot 12 crossed over the station wire 20.

Figure 10:
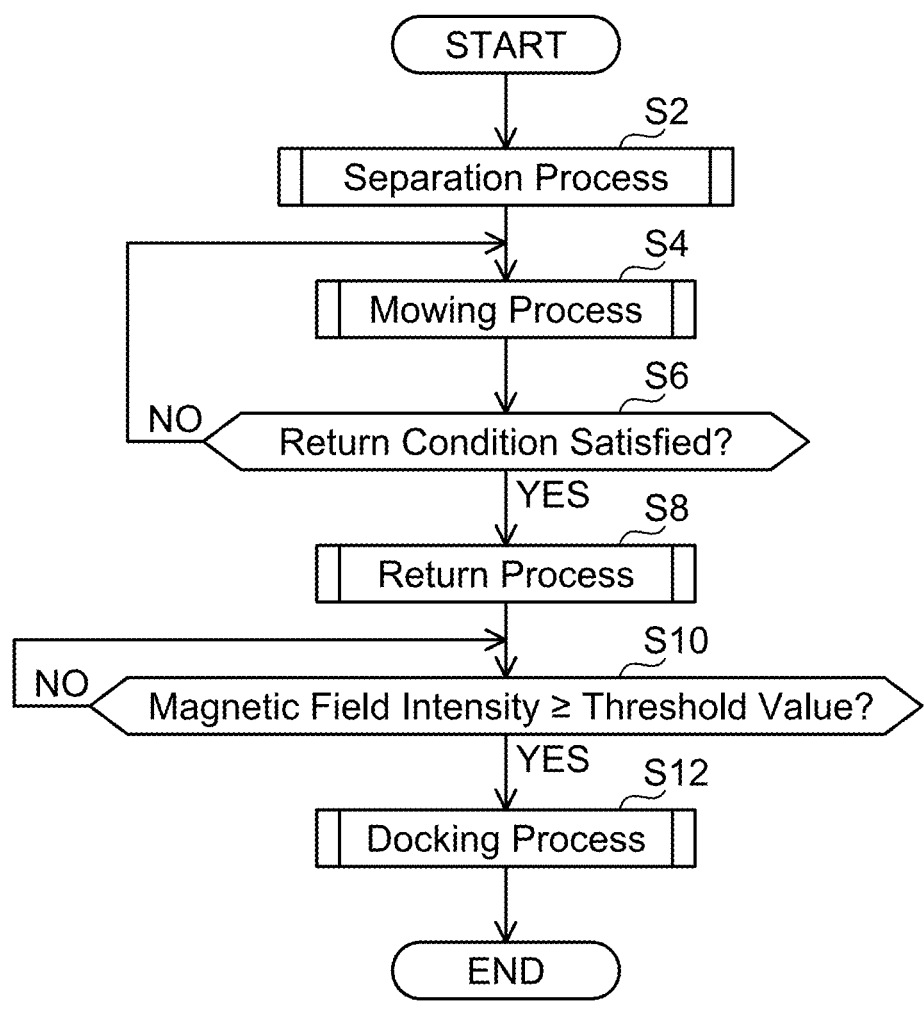
FIG. 10 shows a flowchart of an autonomous movement process.

(Autonomous Movement Process) The control unit 42 executes an autonomous movement process shown in FIG. 10. The autonomous movement process is executed to separate the working robot 12 from the charging station 14, to cause the working robot 12 to perform a mowing operation within the working area WA, to return the working robot 12 to the charging station 14, and to dock the working robot 12 with the charging station 14.

Before S2 of FIG. 10 is executed, the charging interface 48 of the working robot 12 is docked with the charging terminal 74 of the charging station 14, that is, the working robot 12 is electrically connected to the charging station 14. In S2, the control unit 42 executes a separation process.

Figure 11:
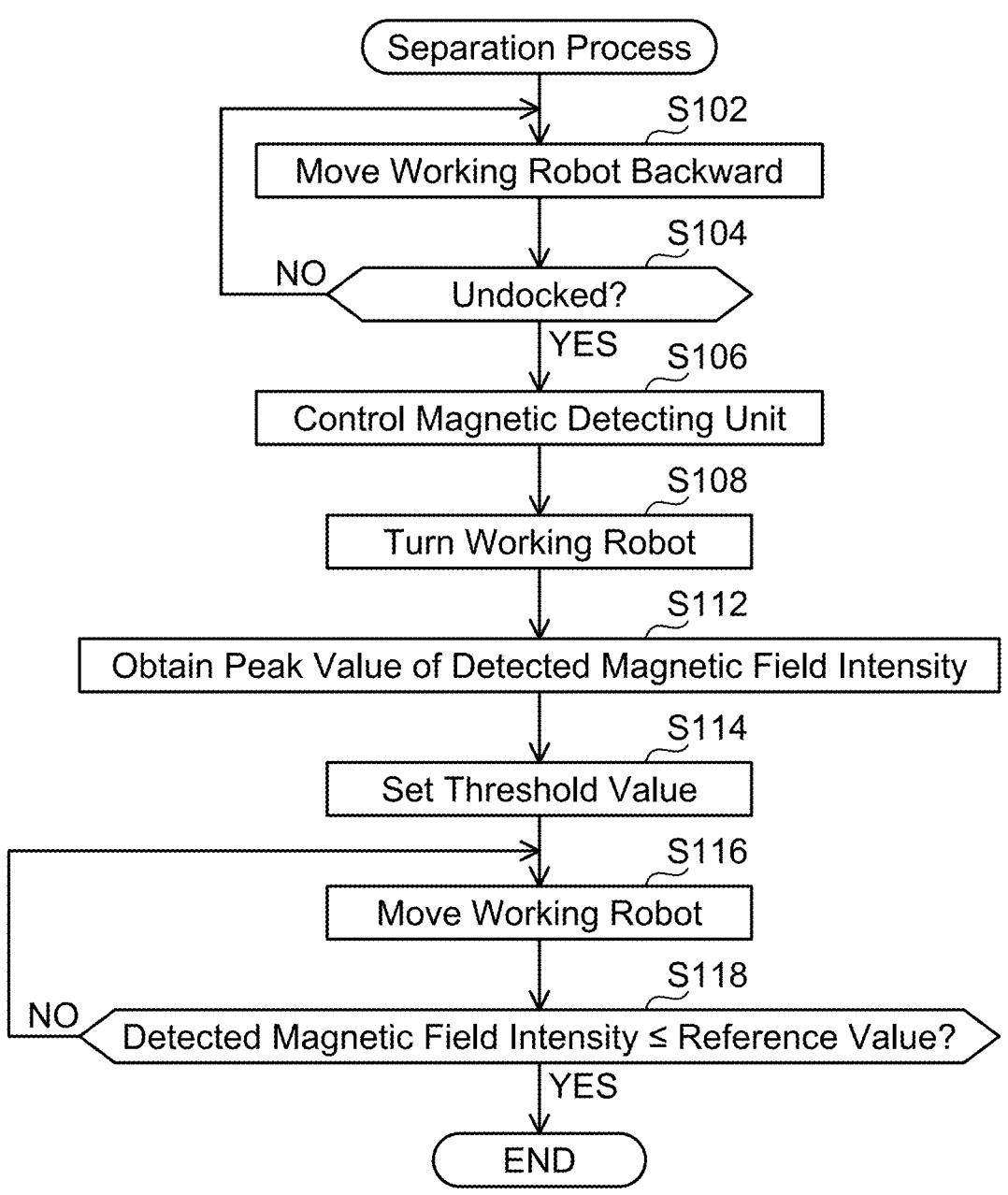
FIG. 11 shows a flowchart of a separation process according to the embodiment.

In S102 of the separation process shown in FIG. 11, the control unit 42 controls the right movement motor 32 and the left movement motor 34 such that they rotate in the reverse direction at the same rotation speed, so that the charging interface 48 of the working robot 12 moves away from the charging terminal 74.

In S104, the control unit 42 determines whether the charging interface 48 has been undocked (electrically disconnected) from the charging terminal 74. When the control unit 42 determines that the charging interface 48 has been undocked from the charging terminal 74 (YES in S104), the process proceeds to S106.

In S106, the control unit 42 controls the magnetic detecting unit 40. In this embodiment, the control unit 42 controls the right front magnetic sensor 60a, the left front magnetic sensor 60b, and the center front magnetic sensor 60c and starts obtaining intensities of the magnetic field of the first loop portion 82 detected by the magnetic sensors 60a, 60b, 60c.

In S108, the control unit 42 controls the right movement motor 32 and the left movement motor 34 to turn the working robot 12 on the spot. For example, the control unit 42 controls the right movement motor 32 and the left movement motor 34 such that the right movement motor 32 rotates in the forward direction (or the reverse direction) and the left movement motor 34 rotates in the reverse direction (or the forward direction). Once the working robot 12 has turned 180 degrees on the spot, the control unit 42 stops the right movement motor 32 and the left movement motor 34.

In S112, the control unit 42 selects one magnetic sensor 60 from the three magnetic sensors 60a, 60b, 60c based on waveforms of the intensities of the magnetic field of the first loop portion 82 detected by the magnetic sensors 60a, 60b, 60c. The control unit 42 obtains the peak intensity of the magnetic field of the first loop portion 82 from the waveform of the magnetic field intensity of the first loop portion 82 detected by the selected magnetic sensor 60. The control unit 42 stores the obtained peak intensity. In a variant, the control unit 42 may select one magnetic sensor 60 from the three magnetic sensors 60a, 60b, 60c based on waveforms of the intensities of the magnetic field of the second loop portion 84 detected by the magnetic sensors 60a, 60b, 60c and store the peak intensity of the magnetic field of the second loop portion 84.

In S114, the control unit 42 sets a threshold value based on the stored peak intensity. The threshold value is equal to or more than 80% of the stored peak intensity. Further, the threshold value is equal to or less than 100% of the stored peak intensity. The control unit 42 stores the set threshold value.

In S116, the control unit 42 controls the right movement motor 32 and the left movement motor 34 such that they rotate in the forward direction, so that the working robot 12 moves away from the charging station 14. The rotation speed of the right movement motor 32 may be the same as or different from that of the left movement motor 34.

In S118, the control unit 42 determines whether intensities of the magnetic field of the first loop portion 82 detected by the magnetic sensors 60a, 60b, 60c, 60d are equal to or less than a reference value. The intensities of the magnetic field of the first loop portion 82 being equal to or less than the reference value means that the working robot 12 is a predetermined distance (e.g., one meter) away from the charging station 14. When the control unit 42 determines that the detected intensities of the magnetic field of the first loop portion 82 are equal to or less than the reference value (YES in S118), the process proceeds to S4 of the autonomous movement process shown in FIG. 10.

In S4 of FIG. 10, the control unit 42 executes a mowing process. Specifically, the control unit 42 controls the working motor 28, the right movement motor 32, and the left movement motor 34. Thus, the working robot 12 moves around within the working area WA with the blade 30*a* rotating, thereby mowing the lawn within the working area WA.

In S6, the control unit 42 determines whether a return condition is satisfied. The control unit 42 determines that the return condition is satisfied for example when the remaining amount of power in the battery 46 reaches a predetermined amount or less. Alternatively, the control unit 42 may determine that the return condition is satisfied when the current time is past a time set by the user or when an abnormality occurs in at least one of the working motor 28, the right movement motor 32, and the left movement motor 34. When the control unit 42 determines that the return condition is satisfied (YES in S6), the process proceeds to a return process in S8.

Figure 12:
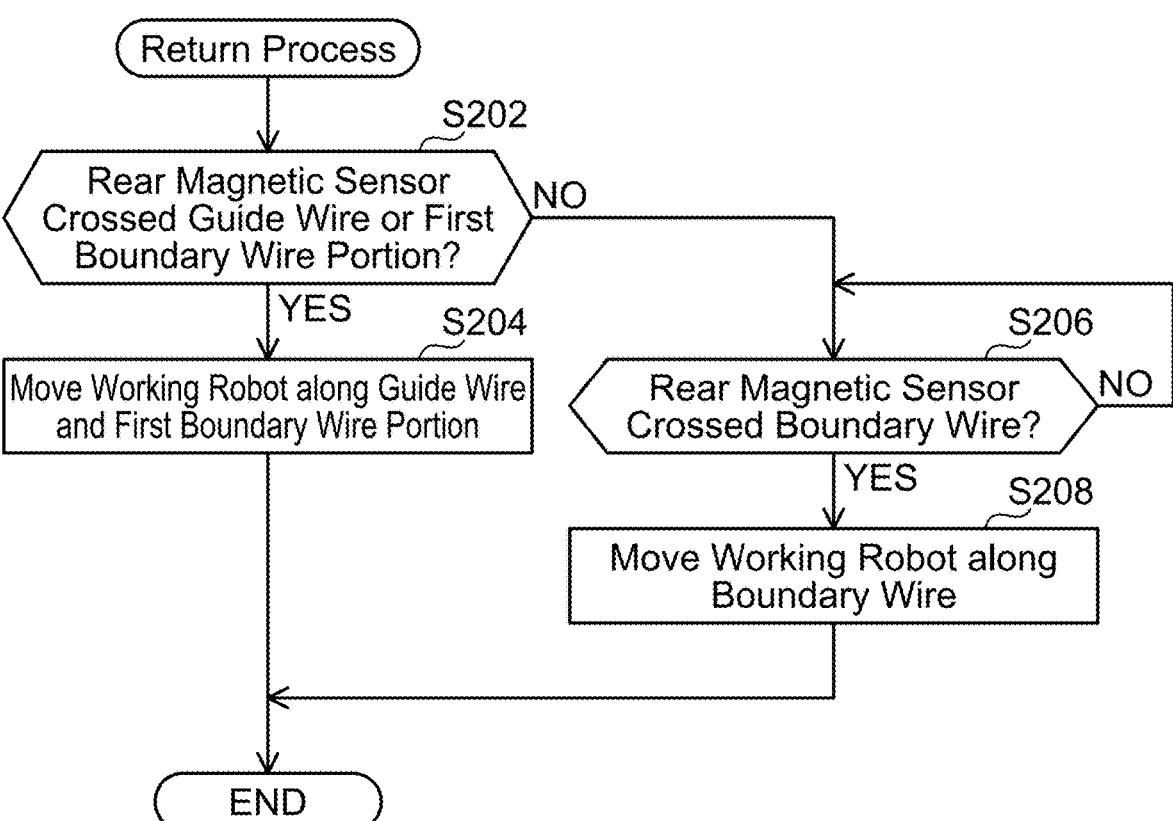
FIG. 12 shows a flowchart of a return process according to the embodiment.

In the return process shown in FIG. 12, the control unit 42 keeps controlling the working motor 28, the right movement motor 32, and the left movement motor 34, that is, the working robot 12 is moving within the working area WA with the blade 30*a* rotating. Thus, the lawn within the working area WA is mowed during the return process as well.

In S202, the control unit 42 determines whether the rear magnetic sensor 60*d* has crossed over the guide wire 18 or the first boundary wire portion 16*a* within a predetermined time period. The control unit 42 determines that the rear magnetic sensor 60*d* has crossed over the guide wire 18 or the first boundary wire portion 16*a* when intensity of the magnetic field of the guide wire 18 or the first boundary wire portion 16*a* detected by the rear magnetic sensor 60*d* has changed from a positive value to a negative value. When the control unit 42 determines that the rear magnetic sensor 60*d* has crossed over the guide wire 18 or the first boundary wire portion 16*a* within a predetermined time period (YES in S202), the process proceeds to S204. When the control unit 42 determines that the rear magnetic sensor 60*d* has not crossed over the guide wire 18 or the first boundary wire portion 16*a* within the predetermined time period (NO in S202), the process proceeds to S206.

In S204, the control unit 42 controls the right movement motor 32 and the left movement motor 34 to move the working robot 12 in a return direction D3 along the guide wire 18 and the first boundary wire portion 16*a*. As shown in FIG. 1, the return direction D3 is the counterclockwise direction. The return direction D3 is the same as the direction of current flowing in the guide wire 18 and the first boundary wire portion 16*a*.

Figure 13:
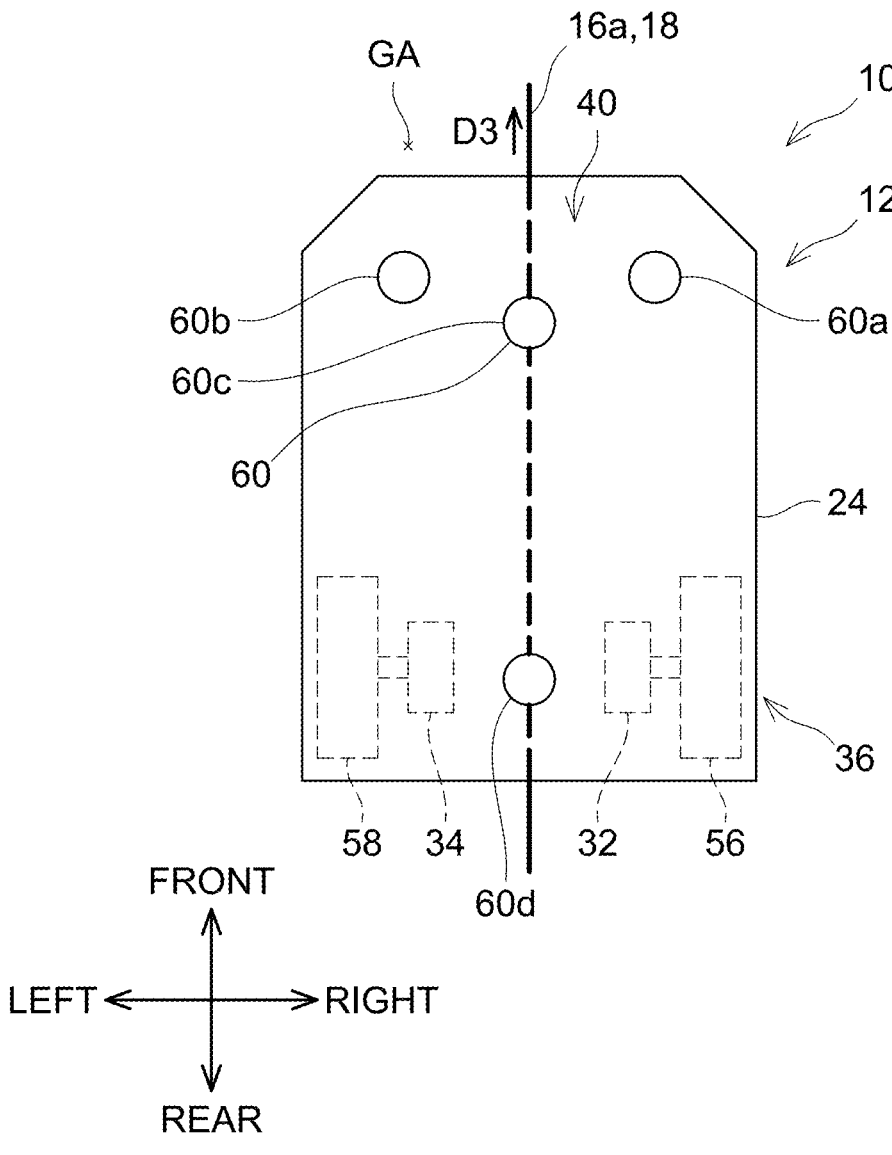
FIG. 13 shows a positional relationship between the working robot 12 according to the embodiment moving in a return direction D3 and a guide wire 18 or a first boundary wire portion 16*a*.

As shown in FIG. 13, while the working robot 12 is moving in the return direction D3 along the guide wire 18 and the first boundary wire portion 16*a*, the control unit 42 controls the right movement motor 32 and the left movement motor 34 such that the intensity of the magnetic field of the guide wire 18 or the first boundary wire portion 16*a* detected by the center front magnetic sensor 60*c* is zero. This allows the center front magnetic sensor 60*c* to be positioned immediately above the guide wire 18 or the first boundary wire portion 16*a* while the working robot 12 is moving. When the intensity of the magnetic field of the guide wire 18 or the first boundary wire portion 16*a* detected by the center front magnetic sensor 60*c* indicates a positive value, which means that the center front magnetic sensor 60*c* is positioned leftward of the guide wire 18 or the first boundary wire portion 16*a*, the control unit 42 controls the left movement motor 34 such that it rotates at a faster rotation speed than the rotation speed of the right movement motor 32. Thereby, the working robot 12 turns right. When the intensity of the magnetic field of the guide wire 18 or the first boundary wire portion 16*a* detected by the center front magnetic sensor 60*c* indicates a negative value, which means that the center front magnetic sensor 60*c* is positioned rightward of the guide wire 18 or the first boundary wire portion 16*a*, the control unit 42 controls the right movement motor 32 such that it rotates at a faster rotation speed than the rotation speed of the left movement motor 34. Thereby, the working robot 12 turns left. Further, the control unit 42 controls the right movement motor 32 and the left movement motor 34 such that the intensity of the magnetic field detected by the rear magnetic sensor 60*d* is a positive value.

In S206 of FIG. 12, the control unit 42 determines whether the rear magnetic sensor 60*d* has crossed over the boundary wire 16 (i.e., the first boundary wire portion 16*a* and the second boundary wire portion 16*b*). The control unit 42 determines that the rear magnetic sensor 60*d* has crossed over the boundary wire 16 when the intensity of the magnetic field of the boundary wire 16 detected by the rear magnetic sensor 60*d* has changed from a positive value to a negative value. In S206, the control unit 42 obtains the intensity of the magnetic field of the boundary wire 16 from a magnetic sensor 60 different from the magnetic sensor 60 used in S202. When the control unit 42 determines that the rear magnetic sensor 60*d* has crossed over the boundary wire 16 (YES in S206), the process proceeds to S208.

In S208, the control unit 42 controls the right movement motor 32 and the left movement motor 34 such that the working robot 12 moves in a return direction D4 along the boundary wire 16 (i.e., the first boundary wire portion 16*a* and the second boundary wire portion 16*b*). As shown in FIG. 1, the return direction D4 is the counterclockwise direction. The return direction D4 is the same as the direction of current flowing in the boundary wire 16.

Figure 14:
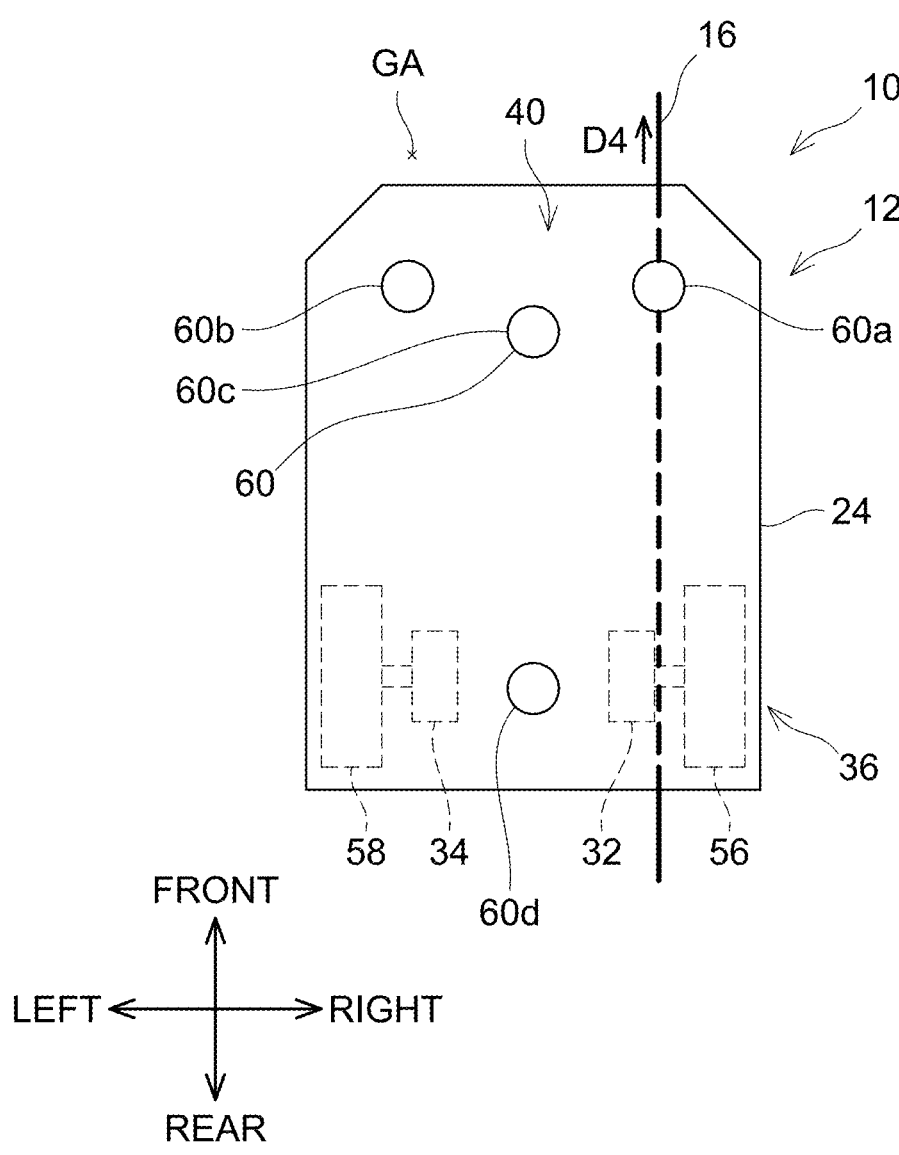
FIG. 14 shows a positional relationship between the working robot 12 according to the embodiment moving in a return direction D4 and a boundary wire 16.

As shown in FIG. 14, while the working robot 12 is moving in the return direction D4 along the boundary wire 16, the control unit 42 controls the right movement motor 32 and the left movement motor 34 such that the intensity of the magnetic field of the boundary wire 16 detected by the right front magnetic sensor 60*a* is zero. This allows the right front magnetic sensor 60*a* to be positioned immediately above the boundary wire 16 while the working robot 12 is moving. This positioning of the right front magnetic sensor 60*a* immediately above the boundary wire 16 minimizes a portion of the working robot 12 that protrudes outside the working area WA as compared to a configuration in which a magnetic sensor 60 other than the right front magnetic sensor 60*a* is positioned immediately above the boundary wire 16. In a variant, if the return direction D4 (see FIG. 1) is the clockwise direction, the control unit 42 may control the right movement motor 32 and the left movement motor 34 such that the intensity of the magnetic field of the boundary wire 16 detected by the left front magnetic sensor 60*b* is zero. The right front magnetic sensor 60*a* positioned immediately above the boundary wire 16 in S208 is different from the center front magnetic sensor 60*c* positioned immediately above the guide wire 18 or the first boundary wire portion 16*a* in S204. When the intensity of the magnetic field of the boundary wire 16 detected by the right front magnetic sensor 60*a* indicates a positive value, which means that the right front magnetic sensor 60*a* is positioned leftward of the boundary wire 16, the control unit 42 controls the left movement motor 34 such that it rotates at a faster rotation speed than the rotation speed of the right movement motor 32. Thereby, the working robot 12 turns right. When the intensity of the magnetic field of the boundary wire 16 detected by the right front magnetic sensor 60a indicates a negative value, which means that the right front magnetic sensor 60a is positioned rightward of the boundary wire 16, the control unit 42 controls the right movement motor 32 such that it rotates at a faster rotation speed than the rotation speed of the left movement motor 34. Thereby, the working robot 12 turns left. Further, the control unit 42 controls the right movement motor 32 and the left movement motor 34 such that the intensity of the magnetic field detected by the left front magnetic sensor 60b indicates a positive value.

As shown in FIG. 10, in S10 after S8, the control unit 42 determines whether one or more intensities of the magnetic field of the first loop portion 82 detected by the magnetic detecting unit 40 are equal to or more than the threshold value. In this determination, the control unit 42 may use only the intensity of the magnetic field detected by the magnetic sensor 60 that was used to determine the threshold value (which may be termed the magnetic sensor 60'), use the intensities of the magnetic field detected by the magnetic sensors 60 other than the magnetic sensor 60', or use the intensities of the magnetic field detected by two or more of the magnetic sensors 60. In a variant, the control unit 42 may monitor one or more intensities of the magnetic field of the second loop portion 84 detected by the magnetic detecting unit 40. When the control unit 42 determines that the one or more intensities of the magnetic field of the first loop portion 82 detected by the magnetic detecting unit 40 are equal to or more than the threshold value (YES in S10), the process proceeds to a docking process in S12. When determining that the one or more intensities of the magnetic field of the first loop portion 82 detected by the magnetic detecting unit 40 are less than the threshold value (NO in S10), the control unit 42 keeps moving the working robot 12 in the return direction D3, D4 until it determines that the one or more intensities of the magnetic field of the first loop portion 82 detected by the magnetic detecting unit 40 are equal to or more than the threshold value.

Figure 15:
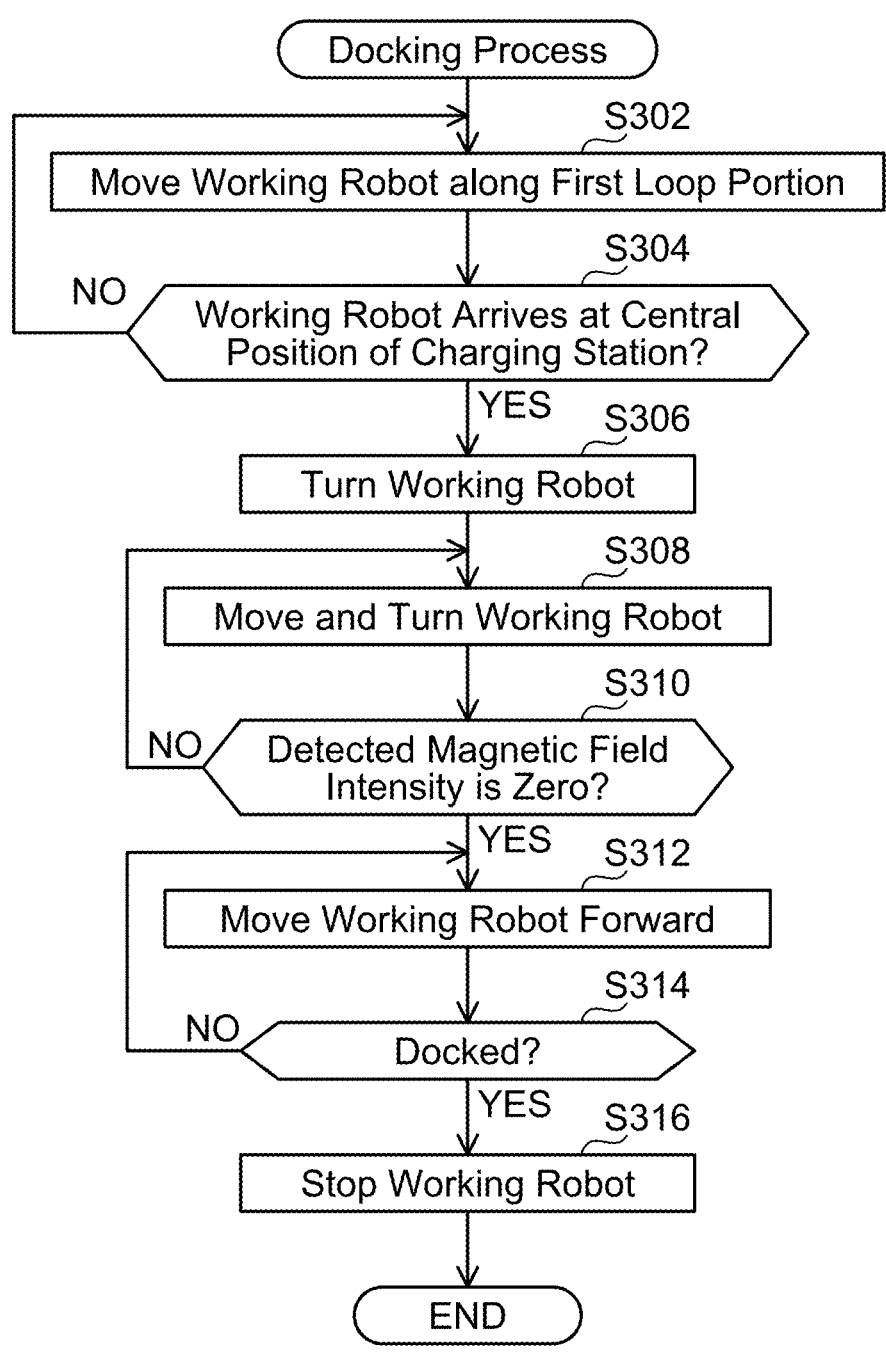
FIG. 15 shows a flowchart of a docking process according to the embodiment.
Figure 16:
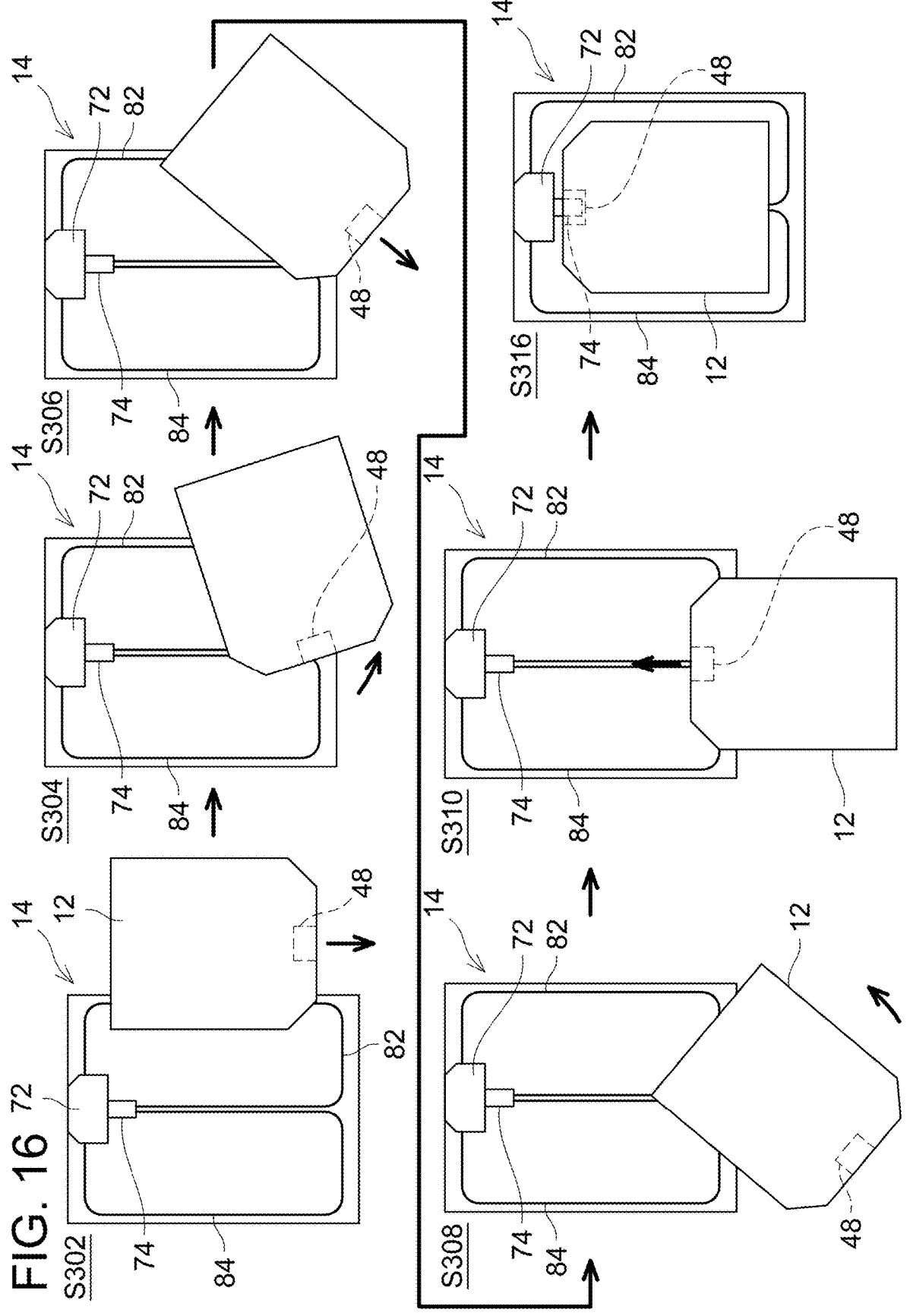
FIG. 16 shows how the working robot 12 moves during the docking process according to the embodiment.

In S302 of the docking process shown in FIG. 15, the control unit 42 controls the right movement motor 32 and the left movement motor 34 such that the working robot 12 moves along the first loop portion 82 based on one or more intensities of the magnetic field of the first loop portion 82 detected by the magnetic detecting unit 40. As shown in FIG. 16, in S302, the working robot 12 moves clockwise along the first loop portion 82.

In S304 of FIG. 15, the control unit 42 determines whether the working robot 12 has reached the center position of the charging station 14 based on the one or more intensities of the magnetic field of the first loop portion 82 detected by the magnetic detecting unit 40. The center position of the charging station 14 is a position at which the intensity of the magnetic field of the station wire 20 is zero, that is, the center position of the charging station 14 is on the boundary between the first loop portion 82 and the second loop portion 84. When the control unit 42 determines that the working robot 12 has reached the center position of the charging station 14 (YES in S304), the process proceeds to S306. As shown in FIG. 16, in S304, the front end of the working robot 12 is positioned near the boundary between the first loop portion 82 and the second loop portion 84.

In S306 of FIG. 15, the control unit 42 controls the right movement motor 32 and the left movement motor 34 such that the right movement motor 32 rotates in the forward direction (or the reverse direction) and the left movement motor 34 rotates in the reverse direction (or the forward direction), so that the working robot 12 turns on the spot. Once the working robot 12 has turned by a predetermined angle, the control unit 42 stops the right movement motor 32 and the left movement motor 34. As shown in FIG. 16, in S306, the front end of the working robot 12 moves away from the boundary between the first loop portion 82 and the second loop portion 84.

In S308 of FIG. 15, the control unit 42 controls the right movement motor 32 and the left movement motor 34 to move and turn the working robot 12. As shown in FIG. 16, in S308, the working robot 12 first moves forward and then turns on the spot. This adjusts the orientation of the working robot 12 relative to the charging station 14.

In S310 of FIG. 15, the control unit 42 determines whether the one or more intensities of the magnetic field detected by the magnetic detecting unit 40 are zero. When the control unit 42 determines that the one or more intensities of the magnetic field detected by the magnetic detecting unit 40 are zero (YES in S310), the process proceeds to S312. As shown in FIG. 16, in S310, the charging interface 48 is positioned above the boundary between the first loop portion 82 and the second loop portion 84 to face the charging terminal 74 of the charging station 14.

In S312 of FIG. 15, the control unit 42 controls the right movement motor 32 and the left movement motor 34 such that they rotate in the forward direction at the same rotation speed, so that the working robot 12 moves forward. Thereby, the working robot 12 approaches the charging terminal 74.

In S314, the control unit 42 determines whether the charging interface 48 has docked with the charging terminal 74. When the control unit 42 determines that the charging interface 48 has docked with the charging terminal 74 (YES in S314), the process proceeds to S316.

In S316, the control unit 42 stops the right movement motor 32 and the left movement motor 34. As shown in FIG. 16, in S316, the working robot 12 stops with the charging interface 48 docked with the charging terminal 74.

(Avoidance Process) The working robot 12 may pass nearby the charging station 14 during the mowing process in S4. In this case, the control unit 42 executes an avoidance process shown in FIG. 17 in order to prevent the working robot 12 from colliding with the charging station 14.

Figure 17:
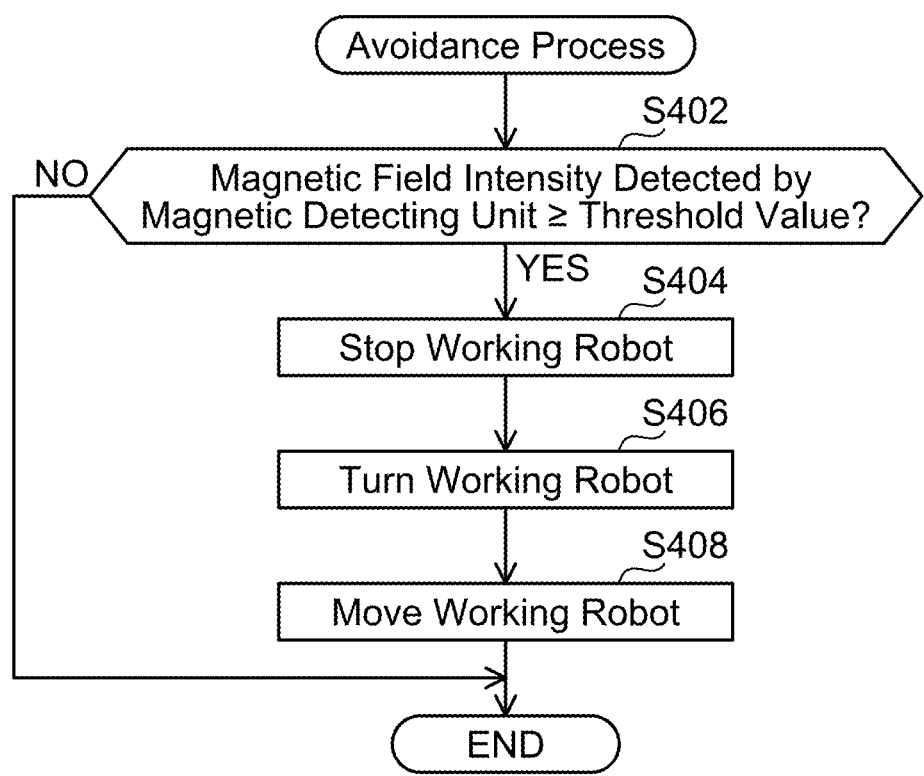
FIG. 17 shows a flowchart of an avoidance process according to the embodiment.

As shown in FIG. 17, in S402 of the avoidance process, the control unit 42 determines whether one or more intensities of the magnetic field of the first loop portion 82 detected by the magnetic detecting unit 40 are equal to or more than a threshold value. When the control unit 42 determines that the one or more intensities of the magnetic field of the first loop portion 82 detected by the magnetic detecting unit 40 are equal to or more than the threshold value (YES in S402), the process proceeds to S404.

In S404, the control unit 42 stops the right movement motor 32 and the left movement motor 34. The working robot 12 is thereby stopped.

In S406, the control unit 42 controls the right movement motor 32 to rotate in the forward direction (or the reverse direction) and controls the left movement motor 34 to rotate in the reverse direction (or the forward direction), so that the working robot 12 turns in the spot. Once the working robot 12 has turned by a predetermined angle, the control unit 42 stops the right movement motor 32 and the left movement motor 34. The predetermined angle can be any angle set for every turn.

In S408, the control unit 42 controls the right movement motor 32 and the left movement motor 34 to rotate in the forward direction, so that the working robot 12 moves away from the charging station 14.

(Effects) The autonomous movement system 10 according to the embodiment comprises the working robot 12 configured to perform an operation while moving autonomously in the working area WA; the charging station 14 configured to charge the working robot 12; the boundary wire 16 defining the working area WA, wherein the boundary wire 16 generates a magnetic field when a current flows in the boundary wire 16; and the station wire 20 disposed at the charging station 14 and electrically connected to the boundary wire 16, wherein the station wire 20 generates a magnetic field when a current flows in the station wire 20. The working robot 12 comprises the working unit 30 configured to perform the operation; the working motor 28 configured to drive the working unit 30; the movement unit 36 configured to move the working robot 12; the movement motors 32, 34 configured to drive the movement unit 36; the battery 46 configured to be charged at the charging station 14 and supply power to the working motor 28 and the movement motors 32, 34; the magnetic detecting unit 40 configured to detect the magnetic field generated by the boundary wire 16 and the magnetic field generated by the station wire 20; and the control unit 42 configured to control the working motor 28 and the movement motors 32, 34 and detect the station wire 20 based on a detection result by the magnetic detecting unit 40. The charging station 14 comprises the charging terminal 74 configured to be electrically connected to the working robot 12 and the signal generator 76 configured to supply the identical first electric signal (an example of electric signal) to the boundary wire 16 and the station wire 20.

According to the configuration above, the single signal generator 76 supplies the identical first electric signal to the boundary wire 16 and the station wire 20. This allows for detection of the station wire 20 using the simple charging station 14 configuration.

The station wire 20 comprises the magnetic field enhancing structure 80 configured to generate, when a current flows in the station wire 20, the magnetic field having higher intensity than intensity of the magnetic field generated by the boundary wire 16 when a current flows in the boundary wire 16.

In the configuration above, the intensity of magnetic field generated by the station wire 20 is higher than the intensity of magnetic field generated by the boundary wire 16. This facilitates detection of the station wire 20.

The control unit 42 is configured to detect the station wire 20 based at least on the intensity of the magnetic field generated by the station wire 20 when a current flows in the station wire 20.

The configuration above allows for detection of the station wire 20 with the simple configuration using the magnetic field intensity.

The station wire 20 is electrically connected in series to the boundary wire 16.

The configuration above allows the identical first electric signal to be supplied to the boundary wire 16 and the station wire 20 using the simple configuration.

The control unit 42 is configured to store intensity of the magnetic field of the station wire 20 when the working robot 12 is at the charging station 14 and detect the station wire 20 based on the stored intensity of the magnetic field and the intensity of the magnetic field of the station wire 20 detected by the magnetic detecting unit 40.

The configuration above allows for more accurate detection of the station wire 20 as compared to configurations in which the control unit 42 does not store the intensity of magnetic field of the station wire 20 when the working robot 12 is at the charging station 14, such as a configuration in which the intensity of magnetic field is stored in advance during manufacturing of the working robot 12, a configuration in which the intensity of magnetic field is set by a user, etc.

The control unit 42 is configured to execute the separation process of S2 to separate the working robot 12 electrically connected to the charging terminal 74 from the charging station 14 and obtain the intensity of the magnetic field of the station wire 20 after the working robot 12 has been separated from the charging terminal 74 during the separation process of S2.

In a configuration in which the control unit 42 obtains the intensity of magnetic field of the station wire 20 before the working robot 12 is separated from the charging terminal 74, the control unit 42 has to obtain the intensity of magnetic field of the station wire 20 while determining whether the working robot 12 has separated from the charging terminal 74 or not. The configuration above allows the control unit 42 to determine whether the working robot 12 has separated from the charging terminal 74 and obtain the intensity of magnetic field of the station wire 20 separately.

The separation process of S2 comprises the turn process of S108 to turn the working robot 12 after it has been separated from the charging terminal 74. The control unit 42 is configured to obtain the intensity of the magnetic field of the station wire 20 during the turn process of S108.

In the configuration above in which the working robot 12 turns, the distance between the working robot 12 and the charging station 14 is less likely to change as compared to a configuration in which the working robot 12 rectilinearly moves away from the charging station 14. Since the control unit 42 obtains the intensity of magnetic field of the station wire 20 during the turn process, variation in the intensity of magnetic field is small as compared to a configuration in which the control unit 42 obtains the intensity of magnetic field of the station wire 20 while the working robot 12 is rectilinearly moving away from the charging station 14.

The magnetic detecting unit 40 comprises the plurality of magnetic sensors 60 configured to detect the magnetic field generated by the boundary wire 16 and the magnetic field generated by the station wire 20. The control unit 42 is configured to obtain intensities of the magnetic field of the station wire 20 detected by the plurality of magnetic sensors 60 during the turn process of S108.

The configuration above allows for detection of the station wire 20 even when one of the plurality of magnetic sensors 60 malfunctions.

The control unit 42 is configured to store the peak intensity of the magnetic field of the station wire 20.

The configuration above allows for accurate detection of the station wire 20 using the peak intensity of magnetic field of the station wire 20.

The control unit 42 is configured to set a threshold value equal to or more than 80% of the stored peak intensity and detect the station wire 20 based on the set threshold value and the intensity of the magnetic field of the station wire 20 detected by the magnetic detecting unit 40.

The intensity of magnetic field detected by the magnetic detecting unit 40 becomes smaller as the distance between the working robot 12 and the station wire 20 becomes larger. Since the threshold value is set as a predetermined proportion of the peak intensity of the magnetic field, the configuration above allows for detection of the station wire 20 even when the working robot 12 is far away from the station wire 20.

The station wire 20 comprises the first loop portion 82 configured to increase an absolute value of a positive value of intensity of the magnetic field of the station wire 20 and the second loop portion 84 configured to increase an absolute value of a negative value of the intensity of the magnetic field of the station wire 20. The control unit 42 is configured to control the movement motors 32, 34 based on the intensity of magnetic field generated by the first loop portion 82 to move the working robot 12 along the first loop portion 82.

Generally, the station wire 20 is detected more accurately in a configuration in which the control unit 42 detects the station wire 20 based on the positive value of magnetic field intensity than in a configuration in which the control unit 42 detects the station wire 20 based on the negative value of magnetic field intensity. In the configuration above, the intensity of magnetic field generated by the first loop portion 82 is used, and thus the working robot 12 can be accurately moved along the first loop portion 82.

The control unit 42 is configured to execute the docking process of S102 to electrically connect the working robot 12 to the charging terminal 74 when the control unit 42 detects the station wire 20 while the working robot 12 is returning to the charging station 14.

If the docking process is executed according to methods different from the method detecting the station wire 20, for example in response to a GPS detecting the position of the working robot 12, the working robot 12 may collide with the charging station 14 before the docking process is executed because the detected position of the working robot 12 could be different from the actual position of the working robot 12. In the configuration above, the docking process is executed in response to detection of the station wire 20, and thus the collision of the working robot 12 with the charging station 14 can be prevented.

The control unit 42 is configured to execute the movement direction changing process of S404, S406, S408 to change the movement direction of the working robot 12 when the control unit 42 detects the station wire 20 while the working robot 12 is performing the operation.

The configuration above prevents the working robot 12 from colliding with the charging station 14.

(Variants) In one embodiment, the working robot 12 may be a cleaner configured to remove foreign matters such as dust from a floor.

In one embodiment, the battery 46 of the working robot 12 may be removable from the housing 24.

In one embodiment, the movement unit 36 of the working robot 12 may comprise crawlers instead of the right front auxiliary wheel 52, the left front auxiliary wheel 54, the right rear drive wheel 56, and the left rear drive wheel 58.

In one embodiment, the station wire 20 may be electrically connected in parallel to the boundary wire 16.

In one embodiment, in the separation process, the control unit 42 may obtain the intensity of magnetic field of the station wire 20 before the working robot 12 is separated from the charging terminal 74.

In one embodiment, in the return process, the magnetic sensor 60 used in S204 may be the same as the magnetic sensor 60 used in S206.

In one embodiment, S404 in the avoidance process may be omitted.

In one embodiment, the threshold value set in S114 of the separation process may be 50% or more of the stored peak intensity.

In one embodiment, the control unit 42 may detect the station wire 20 based on the intensity of magnetic field of the station wire 20 detected when a current flows therein and a degree of correlation (i.e., degree of coincidence) between a waveform of an electric signal applied to the signal generator 76 and a waveform of detected magnetic field. Alternatively, the control unit 42 may detect the statin wire 20 based on a sum of products of the degree of correlation and intensity of the detected magnetic field that are calculated for a predetermined time period.

What is claimed is:

1. An autonomous movement system comprising:
a working robot configured to perform an operation while moving autonomously in a working area;
a charging station configured to charge the working robot;
a boundary wire defining the working area, wherein the boundary wire is configured to generate a magnetic field when a current flows in the boundary wire; and
a station wire at the charging station and electrically connected to the boundary wire, wherein the station wire is configured to generate a magnetic field when a current flows in the station wire,
wherein
the working robot comprises:
a working unit configured to perform the operation;
a working motor configured to drive the working unit;
a movement unit comprising wheels configured to move the working robot;
a movement motor configured to drive the movement unit;
a battery configured to be charged at the charging station and supply power to the working motor and the movement motor;
a magnetic detecting unit comprising a sensor configured to detect the magnetic field generated by the boundary wire and the magnetic field generated by the station wire; and
a control unit comprising a microcomputer configured to control the working motor and the movement motor and detect the station wire based on a detection result by the magnetic detecting unit;
the working unit is fixed to an output shaft of the working motor and is configured to operate by a rotation of the output shaft;
the charging station comprises:
a charging terminal configured to be electrically connected to the working robot; and
a signal generator configured to supply an identical electric signal to the boundary wire and the station wire,
a current waveform and a phase of the electric signal supplied to the station wire are identical to a current waveform and a phase of the electric signal supplied to the boundary wire, and
the station wire is electrically connected in series to the boundary wire.

2. The autonomous movement system according to claim 1, wherein the station wire comprises a magnetic field enhancing structure configured to generate, when a current flows in the station wire, the magnetic field with a higher intensity than an intensity of the magnetic field generated by the boundary wire when a current flows in the boundary wire.

3. The autonomous movement system according to claim 2, wherein
the control unit is configured to detect the station wire based at least on intensity of the magnetic field generated by the station wire when a current flows in the station wire,
the station wire is electrically connected in series to the boundary wire,
the control unit is configured to:

store intensity of the magnetic field of the station wire when the working robot is at the charging station;

detect the station wire based on the stored intensity of the magnetic field and the intensity of the magnetic field of the station wire detected by the magnetic detecting unit;

execute a separation process to separate the working robot electrically connected to the charging terminal from the charging station; and obtain the intensity of the magnetic field of the station wire after the working robot has been separated from the charging terminal during the separation process, the separation process comprises a turn process to turn the working robot after separated from the charging terminal, the control unit is configured to obtain the intensity of the magnetic field of the station wire during the turn process, the magnetic detecting unit comprises a plurality of magnetic sensors configured to detect the magnetic field generated by the boundary wire and the magnetic field generated by the station wire, the control unit is configured to:

obtain intensities of the magnetic field of the station wire detected by the plurality of magnetic sensors during the turn process;

store a peak value of the intensity of the magnetic field of the station wire;

set a threshold value equal to or more than 80% of the stored peak value; and detect the station wire based on the set threshold value and the intensity of the magnetic field of the station wire detected by the magnetic detecting unit, the station wire comprises:

a first loop portion configured to increase an absolute value of a positive value of intensity of the magnetic field of the station wire; and a second loop portion configured to increase an absolute value of a negative value of intensity of the magnetic field of the station wire, the control unit is configured to:

control the movement motor based on the intensity of magnetic field generated by the first loop portion to move the working robot along the first loop portion;

execute a docking process to electrically connect the working robot to the charging terminal when the control unit detects the station wire while the working robot is returning to the charging station; and execute a movement direction changing process to change a movement direction of the working robot when the control unit detects the station wire while the working robot is performing the operation.

4. The autonomous movement system according to claim 1, wherein the control unit is configured to detect the station wire based at least on intensity of the magnetic field generated by the station wire when a current flows in the station wire.

5. The autonomous movement system according to claim 1, wherein the control unit is configured to:

store intensity of the magnetic field of the station wire when the working robot is at the charging station; and detect the station wire based on the stored intensity of the magnetic field and the intensity of the magnetic field of the station wire detected by the magnetic detecting unit.

6. The autonomous movement system according to claim 5, wherein the control unit is configured to:

execute a separation process to separate the working robot electrically connected to the charging terminal from the charging station; and obtain the intensity of the magnetic field of the station wire after the working robot has been separated from the charging terminal during the separation process.

7. The autonomous movement system according to claim 6, wherein the separation process comprises a turn process to turn the working robot after separated from the charging terminal, and the control unit is configured to obtain the intensity of the magnetic field of the station wire during the turn process.

8. The autonomous movement system according to claim 7, wherein the magnetic detecting unit comprises a plurality of magnetic sensors configured to detect the magnetic field generated by the boundary wire and the magnetic field generated by the station wire, and the control unit is configured to obtain intensities of the magnetic field of the station wire detected by the plurality of magnetic sensors during the turn process.

9. The autonomous movement system according to claim 5, wherein the control unit is configured to store a peak value of the intensity of the magnetic field of the station wire.

10. The autonomous movement system according to claim 9, wherein the control unit is configured to:

set a threshold value equal to or more than 80% of the stored peak value; and detect the station wire based on the set threshold value and the intensity of the magnetic field of the station wire detected by the magnetic detecting unit.

11. The autonomous movement system according to claim 1, wherein the station wire comprises:

a first loop portion comprising a first portion of a wire wound more than once and configured to increase an absolute value of a positive value of intensity of the magnetic field of the station wire; and a second loop portion comprising a second portion of the wire wound more than once and configured to increase an absolute value of a negative value of intensity of the magnetic field of the station wire, and the control unit is configured to control the movement motor based on the intensity of magnetic field generated by the first loop portion to move the working robot along the first loop portion.

12. The autonomous movement system according to claim 11, wherein the first loop portion and the second loop portion are adjacent to each other, the charging terminal is located on a boundary between the first loop portion and the second loop portion, a current flows in the first loop portion in one of a clockwise direction and a counterclockwise direction, and a current flows in the second loop portion in another of the clockwise direction and the counterclockwise direction.

13. The autonomous movement system according to claim 12, wherein the control unit is configured to execute a docking process to electrically connect the working robot to the charging terminal when the control unit detects the station wire while the working robot is returning to the charging station, and in the docking process, the control unit controls to move the working robot along the first loop portion, to move the working robot on the boundary between the first loop portion and the second loop portion, and to electrically connect the working robot to the charging terminal.

14. The autonomous movement system according to claim 1, wherein the control unit is configured to execute a docking process to electrically connect the working robot to the charging terminal when the control unit detects the station wire while the working robot is returning to the charging station.

15. The autonomous movement system according to claim 1, wherein the control unit is configured to execute a movement direction changing process to change a movement direction of the working robot when the control unit detects the station wire while the working robot is performing the operation.

* * * * *